United States Patent Office 3,306,875
Patented Feb. 28, 1967

3,306,875
OXIDATION OF PHENOLS AND RESULTING PRODUCTS
Allan S. Hay, Schenectady, N.Y., assignor to General Electric Company, a corporation of New York
No Drawing. Filed July 24, 1962, Ser. No. 212,128
The portion of the term of the patent subsequent to May 26, 1981, has been disclaimed
38 Claims. (Cl. 260—47)

This application is a continuation-in-part of my application, Serial No. 69,245, filed November 15, 1960, now abandoned which in turn is a continuation-in-part of my application, Serial No. 744,086, filed June 24, 1958, now abandoned, both of which are assigned to the same assignee as the present invention.

This invention relates to the preparation of self-condensation products of aromatic compounds containing an hydroxy group directly bonded to the aromatic nucleus, by a process which comprises reacting these compounds with oxygen in the presence of a dissolved oxygen-carrying intermediate comprising a tertiary amine-basic cupric salt complex, and to the novel products produced by this method. More particularly, this invention relates to the oxidation of phenols to self-condensation products in the presence of a dissolved oxygen-carrying intermediate comprising a tertiary amine-basic cupric salt complex and to the novel polymeric products produced thereby. In the preferred embodiment, this invention relates to the preparation of self-condensation products of monohydric, monocyclic phenols by reacting these phenols with oxygen using as the oxygen-carrying intermediate, a solution comprising a basic cupric salt complex of a tertiary amine selected from the group consisting of aliphatic tertiary amines and cyclic tertiary amines, and to the novel polyphenylene ethers produced by this process.

I use the term "monohydric, monocyclic phenol" in its true chemical sense to designate those compounds containing only one hydroxyl group directly attached to a six-membered aromatic ring composed only of carbon atoms, viz., a monohydric phenol of the benzene series. Such a term includes the monohydric, monocyclic phenols such as phenol itself, and those compounds wherein one or more of the ring hydrogens of phenol has been substituted, e.g., the cresols, the xylenols, pseudo-cumenol, etc. It does not include the monohydric, bicyclic phenols such as the α-naphthols and β-naphthols, etc.; the monohydric tricyclic phenols such as the anthranols and anthrols, etc.; and other similar monohydric aromatic compounds.

In a series of articles by Brackman et al., Rec. trav. chim., 74, 937–955, 1021–1039, 1071–1080, 1101–1119 (1955), there is disclosed a process for oxidizing phenols in the presence of amines and cupric salts. This series of articles reports experimental work wherein oxygen is reacted with monocyclic and bicyclic phenols in the presence of a cupric salt and primary, secondary and tertiary amines. In the presence of primary and secondary amines, both the monocyclic and bicyclic phenols are oxidized to produce chemical compounds in which the amine forms an integral part of the product molecule. In the presence of a tertiary amine, only the bicyclic phenols, viz., naphthols, can be oxidized. The products in this case are simple compounds such as naphthoquinones, formed from one or two molecules of the naphthol, naphthones, formed from two molecules of the naphthol and, in the case of β-naphthol (naphthol-2), a naphthoquinone formed from three molecules of the naphthol. No reaction whatsoever occurred when attempts were made to oxidize monocyclic phenols in the presence of a cupric salt and tertiary amines. As Brackman states on page 939, "With respect to the phenols of the benzene series, tertiary amines are completely inactive."

Unexpectedly, I have now discovered a general, rapid, facile and inexpensive method of oxidizing monohydric, monocyclic phenols to various self-condensation products in substantially quantitative yields which comprises reacting such phenols with oxygen, using as the oxygen-carrying intermediate a solution comprising a tertiary amine-basic cupric salt complex in which the phenol reactant is soluble. It was indeed surprising and unexpected to find, in view of the teaching of Brackman et al. with regard to the oxidation of mono- and polycyclic phenols, that my method is applicable to monocyclic, monohydric phenols. Furthermore, by my process the amine does not become an integral part of the reaction product. The products produced by my process are dependent on the phenol used as the starting material, the amine used in the catalyst system, the modifiers present, and the reaction conditions. They vary from crystalline quinones having a simple structure to polyphenylene ethers having extremely high molecular weight and containing a repeating unit which is dependent on the starting material.

The overall oxidation reaction to which my invention is directed is a reaction involving the hydrogen atom of the phenolic group of the phenol molecule, a hydrogen, chlorine, bromine, or iodine substituent in the ortho (2—) or para (4—) position of the phenol molecule and oxygen with the formation of water according to the following schematic diagram using the para position for purposes of illustration:

EQUATION I

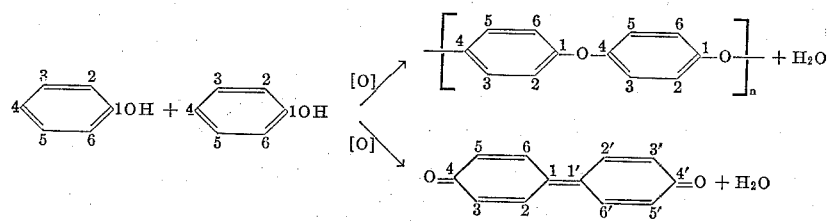

where the numbers indicate the positions of substituents and joining in the names used in this application, and $n$ is an integer having a value of at least 10.

It is to be understood that the reaction is not a direct oxidation between the phenol and oxygen as illustrated but an oxidation involving participation of the copper catalyst system as an oxygen-carrying intermediate.

The general method of carrying out my oxidation process is to pass an oxygen containing gas through a mixture of one or more monohydric, monocyclic phenols (hereinafter referred to as "phenols") as starting material, in a solution also containing dissolved therein a complex comprising at least one basic cupric salt and at least one tertiary amine.

The phenols, which can be oxidized by my process, are represented by the following formula

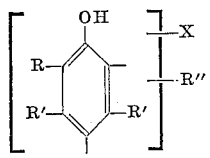

where X is a substituent selected from the group consisting of hydrogen, chlorine, bromine and iodine, R is a monovalent substituent selected from the group consisting of hydrogen, hydrocarbon radicals, hydrocarbonoxy radicals, halohydrocarbon radicals having at least two carbon atoms between the halogen atom and phenol nucleus, and halohydrocarbonoxy radicals having at least two carbon atoms between the halogen atom and the phenol nucleus; R' and R" are the same as R and, in addition, halogen, i.e., fluorine, chlorine, bromide, iodine.

In providing the catalyst comprising a basic cupric salt and tertiary amine, the particular copper salt used has no effect on the type of product obtained. I may start with either a cupric or cuprous salt. The only requirement is that, if a cuprous salt is used it must be capable of existing in the cupric state and must form a complex with the tertiary amine that is soluble in the reaction medium. The necessity for being able to exist in the cupric state is based on my belief that the oxidation of the phenol is accomplished by the oxygen reacting with the tertiary amine-cuprous salt complex to form an intermediate, activated, tertiary amine-basic cupric salt complex that reacts with the phenol to form an unstable intermediate which decomposes forming the self-condensation product of the phenol and water as products and regenerates the tertiary amine-cuprous salt complex. This activated complex can also be formed by starting originally with a cupric salt in making the copper amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkaline salt of a phenol (which could be the phenoxide of the phenol reactant) to a cupric salt, by treating a cupric salt with an ion-exchange resin having exchangeable hydroxyl groups, etc. Preferably, these reactions are carried out in the presence of the tertiary amine to prevent precipitation of the basic cupric salt, but it is possible to add the tertiary amine later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetrammine sulfate, cupric tetrammine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchloroate and cupric nitrate for the cuprous salt, without first converting them to the corresponding basic cupric salt, gave no oxidation of monocyclic phenols in the presence of a tertiary amine. These results substantiate the work of Brackman et al.

Examples of tertiary amines which may be used in practicing my invention are the aliphatic tertiary amines, including cycloaliphatic tertiary amines, for example, trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamino-4-pentene, etc. When aliphatic tertiary amines are used, I prefer that at least two of the aliphatic groups be straight chain hydrocarbon groups.

In general, tertiary polyamines would behave in the same way as tertiary monoamines in my reaction, except of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N'-tetraalkylbutanediamines, the N,N,N',N'-tetraalkylcyclohexanediamines, the N,N,N',N'-tetraalkylpentanediamines, the N,N',N',N",N"-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. I have, however, discovered that those tertiary polyamines which have only two or three aliphatic or cycloaliphatic carbon atoms separating the two tertiary amino nitrogens represent a class of polyamines which is superior to the other aliphatic tertiary amines. For example, in the oxidation of monosubstituted phenols and phenol itself, such polyamines give catalysts of enhanced activity and allow the reaction to be run in a shorter time and/or at lower temperatures than could be used with the aliphatic tertiary monoamines. However, as will be explained later, a mixture of polyamine and monoamine gives a synergistic result in the presence of a non-polar solvent. As in the case of the aliphatic tertiary monoamines, when oxidizing the monosubstituted phenols or phenol itself, the substituents on the amino nitrogen must be large, bulky groups if the high molecular weight polymers are the desired product. These polyamines also are useful in producing catalysts for the preparation of diphenoquinones and especially from the highly hindered 2,6-disubstituted phenols.

Typical examples of these tertiary polyamines are, for example:

N,N,N',N'-tetramethylethylenediamine;
N-ethyl-N,N'N'-trimethylethylenediamine;
N-methyl-N,N',N'-triethylethylenediamine;
N,N,N',N'-tetramethyl-1,3-propanediamine;
N,N,N',N'-tetraethylethylenediamine;
N,N-dimethyl-N',N'-diethylethylenediamine;
1,2-bis(2-methylpiperidino)ethane;
N,N,N',N'-tetra-n-hexylethylenediamine;
N,N,N',N'-tetra-n-amylethylenediamine;
1,2-bispiperidinoethane;
N,N,N',N'-tetraisobutylethylenediamine;
N,N,N',N'-tetramethyl-1,3-butanediamine;
N,N,N',N'-tetramethyl-1,2-cyclohexanediamine;
1,2-bis(2,6-dimethylpiperidino)ethane;
N,N-didecyl-N',N'-dimethylethylenediamine;
N-methyl-N',N',N",N"-tetraethyldiethylenetriamine;
N-decyl-N,N',N'-triethylethylenediamine;

2-(β-piperidinoethyl)pyridine;
2-(β-dimethylaminoethyl)-6-methylpyridine;
2-(β-dimethylaminoethyl)pyridine; and
2-(β-morpholinoethyl)pyridine; etc.

Examples of cyclic amines are the pyridines, such as pyridine itself, α-, β- and γ-collidine, α-, β- and γ-picoline, and 2,4-, 2,5-, 2,6- and 3,4-lutidine, quinuclidine, the dipyridyls, the N-alkyl pyrroles, the N-alkyl pyrrolidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of the cyclic amines whereby one or more of the hydrogen atoms on the carbon forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

Many factors affect the stability of the complex of the tertiary amine and the cuprous salt. These factors are well known in the art and are discussed in detail in such texts as "The Chemistry of the Coordination Compounds" edited by John C. Bailar, Jr., Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex as indicated by the basicity of the tertiary amines I use as ligand also is an indication of the activity of the catalyst. Those tertiary amines which are strong bases form more active catalysts than tertiary amines which are weak bases. When the latter are used, typical examples of which are 3,5-diphenylpyridine, phenanthridine, etc., I find that heating of the reaction mixture is desirable to cause the oxidation reaction to proceed rapidly. These catalysts can be used to advantage when it is desirable to prepare diphenoquinones from the starting phenols, as explained in more detail later, by carrying out the reaction at an elevated temperature preferably also removing the water of reaction as fast as it is formed.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer not to use tertiary amines having an N-aryl substituent.

The phenol starting materials represented by the above general formula may be subdivided into five groups of phenols which can be represented by the following structural formulae:

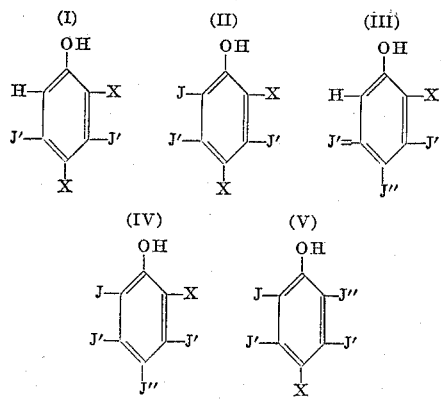

where X is as previously defined; J is a monovalent substituent selected from the group consisting of hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and phenol nucleus; J' is the same as J and in addition hydrogen, and halogen; J" is the same as J and in addition fluorine. Formula I represents those phenols having three reactive positions capable of participating in my oxidation reaction. Formulae II and III represent the two classes of phenols that have two reactive positions while IV and V represent the two classes of phenols having one reactive position.

Some of the phenols falling within the scope of Formula I include:

phenol itself (hydroxybenzene),
2-chlorophenol,
2-bromophenol,
4-bromophenol,
3-chlorophenol,
2,4-dichlorophenol,
2-chloro-4-bromophenol,
2,3,5-trichlorophenol,
2,3,4,5-tetrachlorophenol,
3-methylphenol(meta-cresol),
3-allylphenol,
3-ethylphenol,
3-butylphenol,
3-phenylphenol,
2-chloro-3-methylphenol,
3-methyl-4-chlorophenol,
3-chloro-5-ethylphenol,
2-chloro-4-bromo-3-methylphenol,
3,5-dimethylphenol (3,5-xylenol),
2-chloro-3,5-dimethylphenol,
2,4-dichloro-3,5-dimethylphenol,
3,5-diethylphenol,
3,5-dibutylphenol,
3,5-dioctylphenol,
3-methyl-5-ethylphenol,
3-butyl-5-methylphenol,
3-isobutylphenol,
3-octadecylphenol,
3,5-dibenzylphenol,
3,5-diphenylphenol,
3-naphthylphenol,
3-iodophenylphenol,
3-tolylphenol,
3-(2',4'-dichlorophenyl)-5-(2"-chloronaphthyl-1")phenol,
3-methoxyphenol,
3-ethoxyphenol,
3-butoxyphenol,
3-decoxyphenol,
3-octadecoxyphenol,
3-phenoxyphenol,
3-naphthoxyphenol, 3,5-dimethoxyphenol,
3-methoxy-5-ethoxyphenol,
3-ethoxy-5-ethylphenol,
2-bromo-3-phenoxy-5-benzyloxyphenol,
3,5-di-(chloropropoxy)phenol,
3-iodophenoxyphenol, etc.

Phenols corresponding to Formula II comprise, by way of example, such phenols as:

2-methylphenol (orthocresol),
2-ethylphenol,
the 2-propylphenols,
the 2-butylphenols,
2-cyclohexylphenol,
the 2-(chlorocyclohexyl)phenols,
the 2-octadecylphenols,
2-methyl-4-chlorophenol,
2-methyl-6-bromophenol,
2-methyl-4-chloro-6-bromophenol,
2-(chloroethyl)phenol,
2,3,5-trimethylphenol,
2,3,5-trimethyl-6-chlorophenol,
thymol,
carvacrol,
2-benzylphenol,
2-phenylphenol,
2-naphthylphenol,
2-phenyl-3-methylphenol,
2-butyl-3,5-diphenylphenol,
2-chlorophenol,
the 2-(chlorophenyl)phenols,
2-methoxyphenol(guaiacol),
2-ethoxyphenol,
2-butoxyphenol,
2-nonoxyphenol,
2-lauroxyphenol,
2-phenoxyphenol,
2-naphthoxyphenol,
2,5-dimethoxyphenol,
2-methoxy-5-ethoxyphenol,
2-ethoxy-3,5-dimethylphenol,
2-chloroethoxy-3,5-dichlorophenol, etc.

Phenols corresponding to Formula III comprise, by way of example, 4-methylphenol (para-cresol),
4-ethylphenol,
the 4-propylphenols,
the 4-butylphenols,
the 4-decylphenols,
4-phenylphenol,
4-cyclohexylphenol,
the 4-chlorocyclohexylphenols,
2-chloro-4-methylphenol,
3,4,5-trimethylphenol,
the 4-(chlorophenyl)phenols,
4-ethylphenol,
the 4-butylphenols,
4-allylphenol,
4-chloroallylphenol,
anol,
3,4-dimethylphenol(3,4-xylenol),
3-butyl-4-methylphenol,
4-methoxyphenol,
4-ethoxyphenol,
the 4-butoxyphenols,
the 4-octadecoxyphenols,
4-phenoxyphenol,
4-chlorobutoxyphenol,
the 4-(chlorotoloxy)phenols,
3-methoxy-4-methylphenol, etc.

Phenols corresponding to Formula IV encompass, for example, compounds such as 2,4-dimethylphenol(2,4-xylenol),
2,4-diethylphenol,
the 2,4-dioctylphenols,
the 2-octadecyl-4-butylphenols,
2,4-dimethyl-3-chlorophenol,
2,4-dimethyl-5-bromophenol,
2,4-dimethyl-3-chloro-5-bromophenol,
2,4-di(chlorobutyl)phenol,
2-methyl-4-allylphenol,
eugenol,
isoeugenol,
2-methyl-4-methoxyphenol,
2,4-dibenzylphenol,
2,4-diphenylphenol,
2,4-tolylphenol,
2,4-di-(4'-chlorophenyl)phenol,
2,4-dimethoxyphenol,
2,4-diphenoxyphenol,
the 2,4-di-(chlorophenoxy)phenols,
2-dichlorophenyl-4-chlorotolylphenol, etc.

Typical examples of phenols corresponding to Formula V are:

2,6-dimethylphenol,
2,6-diethylphenol,
the 2,6-dibutylphenols,
2,6-dilaurylphenol,
the 2,6-dipropylphenols,
2,6-diphenylphenol,
2,6-dimethoxyphenol,
2,3,6-dimethylphenol,
2,3,5,6-tetramethylphenol,
2,6-diethoxyphenol,
2-methoxy-6-ethoxyphenol,
2-ethyl-4-stearyloxyphenol,
the 2,6-di-(chlorophenoxy)phenols,
2,6-dimethyl-3-chlorophenol,
2,3-dimethyl-4-chlorophenol,
2,6-dimethyl-3-chloro-5-bromophenol,
2,6-di-(chloroethyl)phenol,
2-methyl-6-isobutylphenol,
2-methyl-6-phenylphenol,
2,6-dibenzylphenol,
2,6-ditolylphenol,
2,6-di-(chloropropyl)phenol,
2,6-di-(2',4'-dichlorophenyl)-3-allylphenol, etc.

The preference of the oxidation reaction to involve the ortho or para positions is so pronounced that, if one of these three positions is substituted with a halogen and the other two with a hydrocarbon radical, the halogen will be removed even though the meta positions are unsubstituted. In such a case, the halogen atom reacts with and inactivates one molecule of copper in the complex. Therefore, it is desirable to use a sufficient amount of the complex to furnish one mole of copper for each atom of halogen removed, or to use a strong acid acceptor as explained later. This removal of halogen does not extend to phenols having a halogen in each of the ortho positions since in this case the electronegativity of the two halogens inactivates the phenolic hydroxyl group so that the phenol cannot be oxidized by my process. If a hydrocarbon and a halogen occupy the ortho positions and either hydrogen or a halogen other than fluorine occupies the para position, only the para position appears to be involved in the oxidation reaction. If hydrogen and a hydrocarbon occupy the ortho positions and a halogen occupies the para position, then both the hydrogen and halogen can be involved in the oxidation reaction in the same manner as if both positions had hydrogen substituents. Since the reaction involving hydrogen atoms in the ortho or para positions does not destroy the catalyst, only a small catalytic amount needs to be used, of the order of 0.1 to 10 mole percent based on the moles of phenol to be oxidized. Therefore, I prefer to use phenols in my oxidation process which have hydrogen in the ring position involved in the oxidation reaction.

As has been indicated previously, certain tertiary amines give an amine-copper complex which is more reactive in promoting or catalyzing the self-condensation reaction than others. But with any one complex, the reactivity is dependent on the copper-to-phenol ratio. The higher the ratio the more rapid the reaction occurs and in general, when polyphenylene ethers are being made, the higher their molecular weight will be. One way of accomplishing a high copper-to-phenol ratio without actually using a large ratio for the total phenol reacted, is to add the phenol slowly to the solution of the tertiary amine-basic cupric salt complex through which oxygen is being bubbled. In this way there is little unreacted phenol present in the reaction mixture and, therefore, the copper-to-phenol ratio is much higher than if all of the phenol was added at once. I have noticed that when I carry out the preparation of polyphenylene ethers by this means the products are lighter in color indicating that this procedure still further suppresses side reactions, perhaps the formation of small amounts of diphenoquinones.

Halomethyl, $\alpha$-haloalkyl and $\alpha$-haloalkoxy groups are so reactive that they produce undesirable by-products in my oxidation reaction. Therefore, I prefer to exclude phenols containing such substituents from my reaction mixture as a principal reactant although they may be present in small quantities as modifiers. However, halohydrocarbon substituents having at least two carbon atoms between the halogen atom and phenol nucleus are not as unstable and may be present as substituents on the principal phenol reactant. Other ring substituents such as nitro, cyano, carboxyl, formyl, etc., which are strongly electronegative, or which are reactive with amines or copper salts should also be excluded as substituents of the phenols used as the principal reactants although phenols containing these groups can be used in minor amounts as modifiers of the polymer.

I have also determined that other groups, which have large spatial bulk, i.e., have a three dimensional structure approaching that of a sphere attached to the nucleus (commonly called crypto-phenols) although not stopping my oxidation reaction, do limit the reaction to the formation of diphenoquinones. As far as I know, only a radical with an $\alpha$-tertiary carbon atom, e.g., tertiary butyl, tertiary amyl, etc., is so bulky that the presence of only one such group in an ortho position will prevent the formation of the polyarylene ethers. The isopropyl group appears to be the borderline case since in the regular reaction both the diphenoquinones and the polyphenylene ether will be produced with the latter predominating if 2-methyl-6-isopropyl phenol is oxidized and the former predominating if 2,6-diisopropyl phenol is oxidized.

Aryl, alkoxy, and aryloxy groups, if present in both of the ortho positions, also will prevent the formation of the polyarylene ethers but will produce diphenoquinones from phenols which are unsubstituted in the para position. However, when these phenols have a halogen in the para position, they preferentially form the polyphenylene ethers.

This leads to the following observations concerning aliphatic, ortho substituents on the phenol starting materials. Substituents that have an aliphatic tertiary $\alpha$-carbon atom will produce the corresponding diphenoquinones and prevent the formation of polyarylene ethers when at least one such ortho substituent is present. Substituents that have an aliphatic, secondary $\alpha$-carbon atom will not prevent the formation of polyarylene ethers but one such ortho substituent will cause at least some formation of the corresponding diphenoquinone and two such ortho substituents will cause the major portion of the product to be the corresponding diphenoquinone and the minor portion to be the polyarylene ether. Ortho substituents having an aliphatic, primary $\alpha$-carbon atom do not hinder the formation of polyarylene ethers at all.

I have further determined that it is necessary to have the oxidation reaction involve only the para position and the phenolic hydrogen, if diphenoquinones or the very high molecular weight polyarylene ethers are the desired products. However, polyarylene ethers can be made having low and intermediate molecular weights by oxidizing phenols having only a reactive ortho position. If the oxidation is carried out with phenols which can react through both the ortho and para positions as well as the phenolic group the polyarylene ethers are usually a mixture of polyarylene ethers with a three dimensional or branched chain structure. Many of these materials are extremely reactive and tend to transform from liquids to gels without producing soluble, solid material that can be isolated. Such materials are useful as casting resins, impregnating compounds, or as thermosetting adhesives.

Surprisingly, I have found that the very high molecular weight polyarylene ethers can be made with extremely high softening points, in the range of 250–300° C. or greater, as shown by the pressing temperatures required to shape them. Depending on the conditions under which they are made they either remain thermoplastic under continued heating in vacuum 250° C., or cure to an infusible state where they are no longer soluble in the usual organic solvents such as toluene, xylene, chloroform, nitrobenzene, etc., in which they are soluble prior to heat treating.

As previously mentioned, the type of product obtained by my process is dependent on the phenol used as the starting reactant, the amine used in the catalyst system, the modifiers present, and the reaction conditions. These products range from crystalline quinones of low molecular weight to polyarylene ethers of high molecular weight. It is also possible to produce products which cover the entire gamut between these two extremes. Quinones are only formed in my reaction when the phenol has an hydrogen or halogen in the para position with respect to the phenolic hydroxyl group.

It will be noticed that phenols corresponding to Formula V have both ortho positions occupied by groups which prevent coupling at these positions leaving only the para position free to form polymeric chains with the hydroxyl group. Phenols corresponding to this formula form a group that is unique, since they can be used as starting materials to produce materials ranging all the way from crystalline chemicals to very high molecular weight resins. Low molecular weight materials can be obtained, for example, by controlling the amount of oxygen reacted, or by introducing into the reaction mixture a liquid which is a solvent for the starting reactants but is a non-solvent for the reaction products after they attain a predetermined molecular weight. Other methods are described in other parts of this specification.

If at least one of the two substituents occupying either the 2 or the 6 position in Formula V is a large, bulky organic group containing a tertiary $\alpha$-carbon atom such as tertiary butyl and the other substituent is other than hydrogen, or if X is hydrogen and both substituents in the 2 and 6 positions are aryl, e.g., phenyl, hydrocarbonoxy, e.g., methoxy, or halohydrocarbonoxy, e.g., chloroethoxy, etc., or, if the temperature of the reaction is high enough and preferably the water of reaction is removed as it is formed when any of the other phenols corresponding to Formula V are oxidized, the oxidation products are crystalline quinones having the structural formula:

(VI)

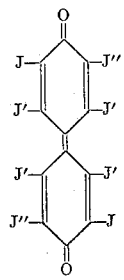

where J, J' and J'' are as defined for Formula V. Theoretically, if each J' is a different group or J and J'' are different groups in the starting phenol, isomeric diphenoquinone should be produced. However, the diphenoquinone product from 2-methyl-6-t-butylphenol appears to be a single crystalline product with a sharp melting point and not separable by chromotography.

Quinones can also be produced from compounds corresponding to Formula II if the X in the ortho position is a halogen, the X in the para position is hydrogen and the J in the ortho position is a hydrocarbon containing an α-tertiary carbon atom, e.g., tertiary butyl, tertiary amyl, etc.

Based upon the above discussion of phenols, it is seen that to produce the high molecular weight polyarylene ethers of my invention, I must use particular phenols in my oxidation process that are selected from the phenols corresponding to Formulae I, II and V. These selected phenols are all defined by the structural formula:

(VII)

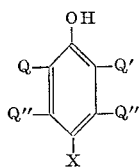

where X is as previously defined, Q is a monovalent substituent selected from the group consisting of hydrogen, hydrocarbon radicals free of tertiary α-carbon atom, and halohydrocarbon radicals having at least two carbon atoms between the halogen atom and phenol nucleus and being free of a tertiary α-carbon atom, hydrocarbonoxy radicals free of a tertiary α-carbon atom, and holohydrocarbonoxy radicals having at least two carbon atoms between the halogen atom and phenol nucleus and being free of a tertiary α-carbon atom, Q' and Q'' are both the same as Q and in addition halogen, with the proviso that X must be halogen when Q and Q' are each substituents selected from the group consisting of aryl radicals, haloaryl radicals, hydrocarbonoxy radicals and halohydrocarbonoxy radicals. Preferably, Q'' represents hydrogen. The term "free of a tertiary α-carbon atom" means that the terminal carbon atom of the aliphatic hydrocarbon substituent which is attached to the phenol nucleus (either directly if the substituent is hydrocarbon or halohydrocarbon or through the oxygen atom if the substituent is hydrocarbonoxy or halohydrocarbonoxy) has at least one hydrogen atom attached to it.

Typical examples of substituents that may be present in the phenols of this invention and which have a tertiary α-carbon atom are:

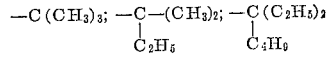

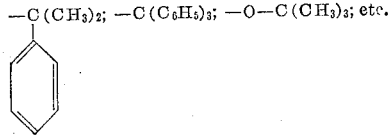

when X represents chlorine, bromine, or iodine, then at least one equixalent of copper must be used in the form of the complex with the tertiary amine for each equivalent of halogen or a strong acid acceptor, for example a base is added, to effectively remove the halogen and regenerate the basic-cupric salt in the complex. Any halogen removed from side chains must also be compensated for by a corresponding increase in copper catalyst or base. Since it is difficult to introduce a fluorine substituent onto the benzene ring of a phenol and fluorine would offer no advantage over the other halogens if in the reactive position, I prefer not have X be fluorine. When X is hydrogen, only an extremely small amount of copper complex needs to be used. Because of this, I prefer to use those phenols wherein the X of Formula VII represents hydrogen. It should be remembered that the rate of oxidation is dependent on the amount of copper catalyst present. In order to have a reasonably fast reaction, I prefer to use at least 0.25 mole percent of copper catalyst based on the amount of phenol used. For each atom of copper I desire two atoms of amine nitrogen when preparing polyphenylene ethers. Lower amounts of amine favor the formation of diphenoquinones as a by-product in the preparation of polyphenylene ethers. A lower ratio can be used when diphenoquinones are the desired product.

It will be seen that the phenols embraced by Formula VII (1) have no more than one halogen in the ortho position, (2) have a halogen in the para position when both substituents in the two ortho positions are aryl, haloaryl, hydrocarbonoxy, or halohydrocarbonoxy radicals, and (3) have a reactive para position with respect to the phenolic hydroxyl.

It will be seen that when such phenols are oxidized to resins by the method of my invention the polyarylene ethers so produced will have repeating units that correspond to the structural formula (VIII)

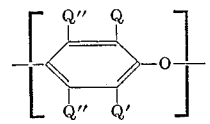

where Q, Q' and Q'' are as defined for the phenol starting material corresponding to Formula VII, and the oxygen atom of one unit is connected to the benzene nucleus of the adjoining unit. It is understood that this repeating unit forms a long chain to provide a final molecular structure representing many of the repeating units. Such a molecular structure can be represented by the formula (IX)

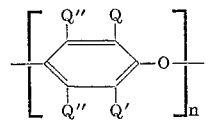

where $n$ is an integer of indeterminate value since the resinous products are mixtures of different chain lengths and the ordinary means of determining molecular weights give an average value. For those materials of low molecular weight, $n$ is an average of 10 to 15, while for the high molecular weight resins having film and fiber forming properties, it is 100 to 1500, or greater.

My oxidation process is capable of producing polyarylene ethers having molecular weights of at least 10,000. Such resins represent polymers having at least 100 repeating units, i.e., $n$ in Formula IX is at least 100. These high molecular weight materials are new chemical compositions. Polyarylene ethers previously have been made, for example, by the Ullman reaction between a para-bromophenol and a potassium phenate in the presence of copper powder. However, such a reaction is apparently not capable of preparing polyarylene ethers having more than about eight repeating units so that the molecular weights are limited to about 1,000. Such materials are still crystalline in nature having sharp melting points. For example, if diphenyl oxide is brominated and reacted with potassium phenate and the resulting compound, repeatedly brominated and reacted with potassium phenate the limiting product appears to be $C_6H_5O(C_6H_4O)_6C_6H_5$ having a melting point of 199–200° C.

The preferred classes of phenols for making high molecular weight resins are those corresponding to the formula (X)

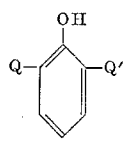

where Q and Q' are as defined for Formula VII and the three positions shown without substituents have a hydrogen atom attached to the ring carbon, except, as previously explained, chlorine, bromine or iodine must be in the para position when both Q, Q' are aryl, haloaryl, hydrocarbonoxy or halohydrocarbonoxy.

Examples of phenols corresponding to Formulae VI, VII and X are given in the phenols corresponding to Formulae I to V, inclusive.

Typical examples of the monovalent hydrocarbon radicals that R, R', R", J, J', J", Q, Q' and Q" may be in all of the preceding formulae are: alkyl, including cycloalkyl, e.g., methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3- and 4-bromobutyl, 2-, 3-, 4- and 5-fluoroamyl, 2-chlorovinyl, 2- and 3-bromoallyl, 2- and 3-fluoropropargyl, mono-, di-, tri-, tetra- and penta-chlorophenyl, mono-, di-, tri-, and tetra-bromotolyl, chloroethylphenyl, ethylchlorophenyl, fluoro-xylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, toloxy, naphthoxy, methylnaphthoxy, benzoxy, phenylethoxy, phenylpropoxy tolylethoxy, etc. The monovalent halohydroxycarbonoxy radicals may be the same as the above oxyhydrocarbons, except methoxy and α-haloalkoxy radicals, where one or more of the hydrogens are replaced by a halogen, i.e., fluorine, chlorine, bromine, or iodine, to produce halohydrocarbonxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3- and 4-iodobutoxy, 2-, 3-, 4- and 5-fluoroamoxy, 2-chlorovinoxy, 2- and 3-bromoalloxy, 2- and 3-fluoropropargoxy, mono-, di-, tri-, tetra- and pentachlorophenoxy, mono-, di-, tri-, and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy, etc.

It has been mentioned previously that phenols having two reactive positions produce three dimensional polymers which are extremely reactive and tend to produce polymers of complex structure. Surprisingly, I have found that phenol having two or three unsubstituted ortho and para positions, i.e., two or three reactive positions, may be oxidized to produce solid, fusible, polyarylene ethers resembling those produced from phenols having only one reactive ortho or para position. This is accomplished by using a tertiary amine in my catalyst system that has one or two large bulky substituents or spatially immobile groups that effectively block one or both of the ortho positions.

Apparently, the amine-copper complex associates with the phenolic hydroxyl group in acting as the oxidation catalyst. Therefore, if the amine has large bulky organic groups these will shield or sterically hinder the ortho positions causing the reaction to occur at the para position if it is reactive. If the para position is not reactive the reaction still proceeds through one of the ortho positions but the products are of much lower molecular weight as was the case with the phenols having only one reactive ortho position.

I have found that the cyclic amines are particularly well adapted for use in my catalyst system when it is necessary to block one or both ortho positions of the phenol. In the case of cyclic amines such as pyridines and quinolines, the ring structure forms a spatial arrangement such that any substituent in either the 2- or 6-position will block one unsubstituted ortho position of the phenol while substituents in both the 2- and 6-position will block both unsubstituted ortho positions of a phenol. Therefore, if the phenol had one unsubstituted ortho position, the cyclic amine would need only a substituent in the 2-position, e.g., α-picoline(2-methylpyridine). If the phenol had both ortho positions unsubstituted, the cyclic amine would need substituents in both the 2- and 6-positions, e.g., 2,6-lutidine.

When polymers are prepared from phenols having more than one reactive position and the amine forming the copper complex has the large bulky groups as described above, the predominant polymer unit in the polymeric chain is the (phenylene-1,4)ether unit represented by the formula VIII where at least one ortho position has a hydrogen atom.

I have noticed that these polymers have a lower intrinsic viscosity for a given molecular weight than the polymers prepared from phenols having only a reactive para position. This indicates that some ortho positions have participated in the polymer forming reaction either alone or with reaction also occurring in the para position to form branched polymers without any substantial cross-linking of the polymer. These polymers as well as the polymers which are coupled through only the para position may be represented by the formula (XI)

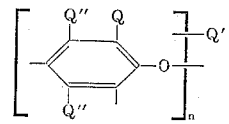

where $n$, Q, Q' and Q" are as previously defined and the oxygen of one unit is attached directly to the benzene nucleus of the adjacent unit.

Although I do not want to be bound by my theory, I believe that one mole of a copper salt forms a complex with two moles of amine nitrogen in the amine, e.g., a mole of monoamine has one mole of amine nitrogen, a diamine has two moles of amine nitrogen, etc. However, it is possible to carry out my reaction with as little as 0.66 mole of amine nitrogen to one mole of copper. However, it may be that in this case only part of the copper is complexed or polynuclear complexes may form. At this low ratio, diphenoquinones become the predominant product and polyphenylene ethers the subordinate product even though the other reaction conditions are such that polyphenylene ethers would normally be formed. The complex formed from a cuprous salt and a tertiary amine can react with oxygen to form an oxidized intermediate while the complex formed from a cupric salt is already in the form of the oxidized intermediate which in some manner can form a complex with the phenol. This latter complex activates the aryl nucleus in some way so that either the polymeric chains or diphenoquinones are formed, with the regeneration of the catalyst in the reduced or cuprous state which can react with additional oxygen to form the active oxidized intermediate. This belief is based on the fact that, if I pass oxygen into my catalyst system prepared from a cuprous salt until it is saturated or treat one equivalent of a cupric salt with one equivalent of a base and then add the phenol, with no further addition of oxygen, one mole of phenol is oxidized for two moles of catalyst present. By such a reaction, I can cause the self-condensation of phenols without actually passing oxygen into the reaction system containing the phenol. These reactions are illustrated by the following equations using $\phi$ to represent the aryl nucleus of the phenol reactant and (A) to represent a tertiary monoamine, KOH as representative of a typical base and CuCl and CuCl$_2$ as representative of typical cuprous and cupric salts.

*Preparation of tertiary amine-basic cupric salt complex*

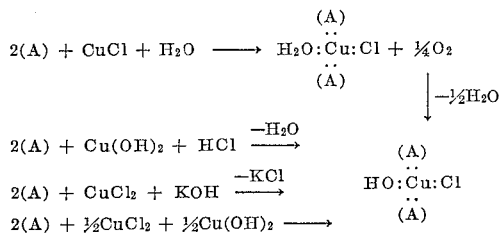

*Reaction with the phenol*

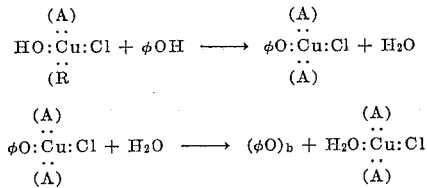

where $b$ can be two or more. When $b$ is two the product may be either a diphenoquinone or a polyphenylene ether dimer. It will be noted that although the above is theoretical it does provide indications as to the role of water in determining the nature of the product and how the complex is regenerated and acts as the oxygen-carrying intermediate. Since water is a product of the reaction and completely anhydrous reagents are extremely difficult to obtain, I have never found it necessary to actually add water to the reaction mixture even when starting with a cuprous salt.

As will be evident from the above equations, it is desirable when starting with a cupric salt to add one equivalent of base for each mole of copper salt to most effectively use all of the copper. If less base is used then only the equivalent amount of copper salt is converted to the catalytically active tertiary amine-basic cupric salt complex leaving the balance of the cupric salt unchanged which even in the form of its tertiary amine complex is an inactive ingredient in the system. Likewise, if more than one equivalent of base is added, then some or all of the cupric salt is converted into cupric hydroxide which likewise is an inactive ingredient even in the form of its tertiary amine complex. In effect, the addition of more or less than one equivalent of base, i.e., one mole of hydroxyl ion, to a mole of cupric salt results in the same effect as though less of the cupric salt had been used to form the tertiary amine-basic cupric salt complex. This same effect is noted if more than one equivalent of acid, i.e., one mole of hydrogen ion or one mole of a cupric salt is added to one mole of cupric hydroxide in forming the complex.

The cupric salts of carboxylic acids, for example, cupric acetate, cupric benzoate, etc., represent a unique class of cupric salts. They will form a complex with tertiary amines which, in the presence of oxygen, will produce polyphenylene ethers but these products are much lower in molecular weight and the reaction is slower than if the cupric carboxylate had been converted to the corresponding tertiary amine-basic cupric carboxylate complex. Evidently because of the weakly acidic nature of carboxylic acids, the phenol and the cupric carboxylate complex are in equilibrium with the phenol complex and the carboxylic acid according to the following equation where $\phi$ represents the aryl nucleus of the phenol and AcO represents the carboxylate ion and (A) represents a tertiary monoamine

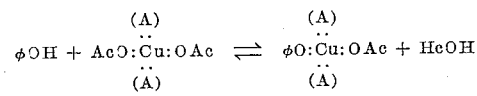

Apparently the equilibrium is predominantly to the left-hand side of the equation, since the slow reaction indicates a low concentration of the active species.

It will be noted that this phenol-cupric complex on the right-hand side of the equation is the same as would be obtained from a cuprous salt and oxygen or a cupric salt and a base when reacted with a phenol in a non-equilibrium reaction. In the specification and claims, I use the term "tertiary amine-basic cupric salt complex" to denote the catalytically active complex described above which acts or is used as the oxygen-carrying intermediate in the oxidation of the phenols to self-condensation products. As shown above, this complex can be obtained either from cuprous or cupric salts and oxidizes the phenols to self-condensation products while the copper in the complex is reduced to the cuprous state.

If the quantity of phenol to be reacted is greater than can be oxidized by the amount of complex present, oxygen is introduced into the reaction mixture to re-oxidize the cuprous complex back to the basic cupric complex. Whether this is done or wether the stoichiometric amount of the tertiary amine-basic cupric salt complex is used to oxidize the phenol, the net overall reaction in either case is the reaction of oxygen, either elemental or, from the complex, with the phenol. This reaction, therefore, may best be described as the reaction of phenols with oxygen using the tertiary amine-basic cupric complex as the oxygen-carrying intermediate.

Although mixtures of tertiary amines and mixtures of copper salts may be used, no benefit generally accrues from such use. However, as will be explained later many different solvents may be used for carrying out the oxidation reaction. I have noted that polar solvents are better solvents than non-polar solvents for the tertiary amine-basic cupric salt complex made from the tertiary polyamines and therefore, higher concentrations of the complex may be obtained by using a polar solvent with these complexes. This is sometimes desirable in order to use low temperatures and yet obtain high molecular weight polymers. The solubility of these complexes in non-polar solvents may be increased by increasing the amine-to-copper ratio, but this is not always desirable since the amine is expensive and requires additional washing steps to insure removal of the amine from the final product. A better alternative is to use a mixture of the polyamine and an aliphatic monoamine to form the complex. Surprisingly, I found that the mixture gave a synergistic result since the mixture gave a higher rate of reaction and higher molecular weight polyphenylene ethers at lower copper-to-phenol ratios than either amine when used alone to form the complex.

Preferably, the copper complex is dissolved in the solvent before the phenol reactant is added. In some cases the dissolving of a cuprous salt, if it is used, may be hastened by heating the mixture, by bubbling in air or oxygen, or a combination thereof. In order to effectively use all of the copper, enough amine should be added to complex and thereby dissolve all of the added copper salt. Larger excesses of amine do not adversely affect the reaction, and, in some cases, may be desirable in order to completely dissolve all of the phenol reactant, to suppress diphenoquinone formation, to increase solubility of the complex, and may also be used as a solvent for the reaction product. Other solvents such as alcohols, ketones, hydrocarbons, chlorohydrocarbons, nitrohydrocarbons, ethers, esters, amides, mixed ether-esters, sulfoxides, etc., may be present in the reaction system providing they do not interfere or enter into the oxidation reaction. The sole function of the solvent is to provide a liquid phase in which both the phenol and tertiary amine-basic cupric salt complex is soluble. It need not act as a solvent for the reaction products. The very high molecular weight polyphenylene ethers greatly increase the viscosity of the reaction mixture. Therefore, it is sometimes desirable to use a solvent system which will cause them to precipitate while permitting the lower molecular weight polymers to remain in solution until they form the higher molecular weight polymers.

When less than the stoichiometric amount of the tertiary amine-basic cupric salt complex is used, oxygen or an oxygen-containing gas is bubbled into the reaction mixture causing an exothermic reaction to take place with the formation of water as a by-product. Since this method permits the same products to be formed but uses less quantities of the complex, I prefer to use this method. If resins are the desired product, and a solvent is used which is not miscible with the water formed, it is desirable to remove the water fast enough to prevent the formation of a separate phase which tends to inactivate the catalyst, perhaps by extraction or hydrolysis. The addition of alcohols, for example, ethanol, isopropanol, etc., which are miscible with the reaction mixture, can be used to prevent the formation of an aqueous phase. When the solvent is miscible with water, no special precautions need to be taken to remove the water when the solvent is not to be reused without purification, e.g., in a batch process. However, water may be removed if desired and should be removed if the solvent is to be reused without purification, e.g., in a continuous recycling process. If the desired product are diphenoquinones, provisions should be made to allow the water to escape as fast as it is formed to minimize polymer formation, but generally it is not required for those phenols, as explained earlier, which cannot form polyarylene ethers. Water can be removed from these reactions, for example by sweeping with an inert gas, by carrying out the reaction at subatmospheric pressure, by use of desiccants, by azeotropic distillation, by the use of open reaction vessels, by heat, or any combination thereof. Desiccants are especially useful for removing excess water where the water forms faster than it can evaporate and it forms a separate phase with the reaction medium.

In carrying out my reaction using oxygen, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of all of the water as it is formed.

Since the reaction is usually exothermic the reaction can become overheated, resulting in the formation of undesirable products. This is especially true in the formation of resins where I have noticed that if I do not control the heat of reaction, the resins tend to cross-link and form gels. Generally, for polymer formation, I initiate the oxidation reaction at as low a temperature as the reaction will start, as evidenced by the reaction becoming exothermic. Higher temperatures favor the formation of diphenoquinones. Usually, I control my oxidation reaction so that the maximum temperature does not exceed 100° C. and preferably does not exceed 80° C. The heat of reaction may be removed, for example, by radiation, convection, or by cooling coils which can either be immersed in, or surround the reaction vessel.

Ordinarily, I continue the passage of oxygen into the reaction mixture until no more heat is generated, or the desired amount of oxygen is absorbed. Alternatively, I may intermittently or continuously add the same or a different phenol than the starting material during the oxidation reaction. If a different phenol is added, the product is a mixed polyarylene ether which has a different structure than if the mixed phenols were used as starting materials. To terminate the reaction, I destroy the catalyst system by addition of an acid preferably a mineral acid, for example, hydrochloric or sulfuric acid, etc., or a base, for example, lime sodium hydroxide, potassium hydroxide, etc., which reacts with the complex of the tertiary amine and basic cupric salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which inactivates the copper or I may pass the solution over an active adsorbent for the catalyst and other by-products. After the product is precipitated, it may be redissolved and reprecipitated any desirable number of times to remove impurities. Finally, it is filtered and washed free of any remaining contaminants. When dry, the product, if a quinone, is ready to be used as a chemical compound or, if it is a resin, it can be fabricated into useful products by molding extrusion, melt spinning, etc., or it may be dissolved in solvents to prepare soluitons which can be used in the preparation of coatings, fibers, adhesives, etc.

Modifiers of the reaction can be added to the reaction mixture to yield products that have improved properties over the products prepared in the absence of the modifier. Modifiers which I have found to be particularly useful in my process are: anion exchange resins, especially those containing tertiary amine groups as the active moiety, nitro-aromatics such as mono-, di-, and trinitrobenzenes, mono-, di-, and trinitrophenols, etc.; peroxide deactivators, such as heavy metals and their oxides; adsorbents such as activated charcoal, silica gel, alumina, etc.

Although the anion exchange resins are insoluble in the reaction mixture, it appears that they function in some way, probably as promoters or cocatalysts, with the copper-amine complex. The use of an anion exchange resin as a modifier is especially useful when the phenol being oxidized is unsubstituted in either one or both of the ortho positions with respect to the phenolic hydroxyl group. As discussed previously, this reaction ordinarily would be carried out using special tertiary amines. I have found that in some manner the anion exchange resins, which comprise dialkylamino groups attached to an insoluble matrix, have a beneficial effect on the course of the reaction similar to that obtained with the special amines. For example, when ortho-cresol is oxidized in pyridine solution with a cuprous chloride catalyst in the presence of an anion exchange resin consisting of dimethylamino groups on a styrene-divinylbenzene matrix a soluble polymer is formed. When the same reaction is carried out in the absence of the anion exchange resin or special amine catalyst, complex products are formed which are not as useful. As far as I am aware, there is no requirement that these resins must meet other than that they must be able to adsorb anions which is a characteristic of all anion exchange resins. Typical examples of such anion exchange resins which I can use are amine-modified or quaternized polymers, e.g., cross-linked styrene-divinylbenzene polymers, styrene-glycol dimethacrylate polymers, aniline-formaldehyde resins, aryl polyamine-formaldehyde resins, phenol-formaldehyde resins, urea-formaldehyde resins, melamine-formaldehyde resins, etc., which have been modified with amines. Those compounds which are reaction products of formaldehyde can be modified with amines while in the methylol stage. All compounds can be chlormethylated and then reacted with amines. Such materials are readily available commercial products.

The effect of adding nitroaromatics such as picric acid and nitrobenzenes to the reaction mixture appears to be the destruction or the prevention of the formation of by-products which would react with the main product to produce an impure material of less desirable properties. The use of nitroaromatics is extremely advantageous for producing resinous materials of much lighter color than is possible under the same reaction conditions when they are absent. Their use is particularly desirable when using tertiary amines as the catalyst which are oxidatively unstable, i.e., easily discolor in the presence of oxygen, e.g., aliphatic tertiary amines. Since the nitrophenols can form complexes with the copper-amine catalyst, enough catalyst should be used to supply an excess of catalyst over that which will react with any nitrophenol present.

In order to prevent the accumulation of peroxides which may cause attack of the phenol at an undesired position on the aromatic ring, peroxide deactivators can be employed, for example, selenium, silicon, lead, mercury, copper, silver, gold, nickel, palladium, platinum, cobalt, rhodium, iridium, iron, ruthenium, osmium, manganese, chromium, molybdenum, tungsten, vanadium, niobium, cerium, thorium, etc., and their oxides or salts. Other peroxide deactivators are described on pages 467–501 of "Hydrogen Peroxide" by Schumb, Satterfield, and Wentworth, Reinhold Pub. Corp., New York, New York, 1955.

The reaction can also be carried out in the presence of adsorbents which tend to remove by-products present in minor amounts and which may adversely affect the reaction. Examples of these adsorbents are activated carbon, silica gel (including zerogels, aerogels, fume silica, etc.), alumina, magnesium silicate, etc.

I have also found that I may improve the quality of my polyarylene ethers if I add an organic sulfur containing compound which also has reducing properties to a solution of the product at the end of the oxidation reaction. Typical of such compounds are thiourea and its derivatives. These materials not only remove all of the copper from the product but they also destroy color-forming by-products which may be undesirable in the final product. These color formers appear to be diphenoquinones. Such colored materials are true chemical by-products and not part of the polymer molecule since they may be removed from the polymer. However, where a colored final product is desired, as part of the polymer molecule, I may intentionally add hydroquinones or quinones to the reaction mixture to obtain a controlled, desired color in my final product that is not removable. The more weakly basic amines, for example, pyridine, appear to be best suited for making the copper complex when such colored products are desired. Typical of the hydroquinones I may use are hydroquinones, catechol, substituted hydroquinones such as toluhydroquinone (methyl hydroquinone), halogen substituted hydroquinones such as tetrachlorohydroquinone, the naphthohydroquinones, the dihydroxyanthracenes, the dihydroxyphenanthrenes, etc.

In order that those skilled in the art may better understand my invention, the following examples are given which are illustrative of the practice of my invention and are not intended for purposes of limitation. In the examples all parts are by weight unless stated otherwise.

In general, the oxidations are carried out at room temperature by passing oxygen gas at a rate fast enough to provide an excess over that being absorbed, into a vigorously stirred solution containing the phenol and a copper salt dissolved in a suitable solvent which is usually the amine or the amine and a suitable solvent. Oxygen is passed into the reaction mixture until no more heat is evolved. The temperature rises at first and then begins to fall upon completion of the reaction. Where the product is either soluble or partially soluble in the reaction mixture, the latter is added to about five times its volume of a non-solvent for the polymer. Where dilute hydrochloric acid is present in the non-solvent, enough acid is used to neutralize all the amine present in the reaction mixture. If aqueous hydrochloric acid is the non-solvent it is about 6N in HCl, although more dilute or concentrated solutions can be used. The precipitated product is then removed by filtration. Where the product is insoluble in the original reaction mixture, it is removed by filtration. Variations from this procedure are designated in specific examples.

The following examples illustrate the oxidation of 2,6-disubstituted phenols.

EXAMPLE 1

Oxygen was passed for 10 minutes into a reaction mixture containing 5 grams of 2,6-dimethylphenol,

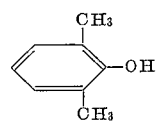

one gram of CuCl and 100 ml. of pyridine. During the course of the reaction the temperature rose to a maximum of 70° C. No water was removed during the course of the reaction. The product was precipitated by pouring the reaction mixture into about 500 mls. of dilute hydrochloric acid and was separated by filtration.

The product, poly-(2,6-dimethyl-1,4-phenylene)-ether, is characterized by recurring structural units of the formula:

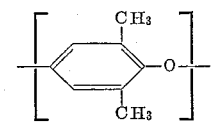

where the oxygen atom of one unit is joined directly to the phenyl nucleus of the adjacent unit.

It was produced in substantially quantitative yields.

This product had a molecular weight by light scattering in the range of 300,000–700,000 and did not melt at 300° C. The powder produced on precipitation could be molded, callendered, or extruded under pressure of 2,000 lbs./sq. inch, into a unitary piece at 240° C. Tough films were made from 10% solutions of the polymer in each of the following solvents, (1) benzene, (2) toluene, (3) xylene, (4) tetrahydrofuran, (5) pyridine, by spreading the solutions on a glass surface and removing the film after the solvent had evaporated. These films were oriented by stretching and cold drawing. Fibers were prepared by extruding a saturated xylene solution of the polymer into air. These fibers could also be oriented by stretching and cold drawing.

EXAMPLE 2

If air is used in place of oxygen the reaction rate will be slower and the maximum temperature attained will be lower because of the heat removed by the inert nitrogen. For example, when air was passed into a well stirred mixture of 5 g. of 2,6-dimethylphenol, 1 g. cuprous chloride and 125 ml. of pyridine, the temperature increased from 30° C. to 43° C. in 14 minutes, and thereafter decreased to 36° C. during the next 9 minutes. At the end of this time the reaction mixture was poured into methanol, and then washed thoroughly with methanol containing sufficient 12M hydrochloric acid to maintain the methanol acidic. The yield was 4.9 g., compared to 4.92 g. theoretical, of the poly(2,6-dimethylphenylene-1,4)ether having the same repeating unit as above. It had an intrinsic viscosity of 0.625.

EXAMPLE 3

The intrinsic viscosity and physical properties can be varied by controlling the amount of oxygen absorbed in the reaction mixture. In order to measure the actual amount of oxygen absorbed it was necessary to use a closed system having a suitable reservoir for supplying the oxygen and a suitable levelling device to maintain the entire system at atmospheric pressure. Two gas burettes connected by a series of stopcocks to a levelling bulb, a source of oxygen, a manometer and the reaction vessel provide a suitable closed system in which one gas burette can be recharged with oxygen during the run in which oxygen is supplied from the other burette. Using such a system, two batches of 50 grams of 2,6-dimethylphenol were oxidized in the presence of 1 gram of cuprous chloride and 500 ml. of pyridine. The phenol was not added until the other materials had been saturated with oxygen. The reaction temperature was maintained at 30° C. by partially immersing the reaction vessel in a constant temperature bath. At the end of 60 minutes 102% of the theoretical amount of oxygen was absorbed that is required to oxidize all of the phenol to the polyarylene ether. At this time, the reaction mixture was poured into water to precipitate the product. It was washed with dilute aqueous hydrochloric acid until no more pyridine odor could be noticed and then with water. The polymer was digested six times in acetone, followed by dissolving in chloroform and precipitating in methanol. Both batches were combined by dissolving in chloroform, mixing and precipitating in methanol. This product is listed as Product A in Table I. Product B was prepared in the same manner as Product A but the reaction was continued for 70 minutes in the case of the first batch which contained only 40 grams of phenol, and 90 minutes in the case of the second batch which contained 50 grams of the phenol. In both of these cases 107% of the theoretical amount of oxygen required to oxidize the phenols was absorbed. Product C represents a polymer made by a two step process. The procedure was the same as for Product A except 2.5 grams of cuprous chloride was used. At the end of 3.5 minutes approximately 50% of the theoretical amount of oxygen had been absorbed. The reaction was killed by adding enough hydrochloric acid to make the solution acidic. The polymer was extracted from the aqueous solution with benzene and washed with a 5% aqueous sodium hydroxide solution to remove any unreacted phenol. The benzene solution was washed with water and dried with a desiccant. The benzene was evaporated to isolate the polymer as a low molecular weight, brittle polymer. Twenty-nine grams of this low molecular weight polymer was dissolved in 620 ml. of pyridine containing 3.1 grams of cuprous chloride and oxidized for 1 hour by the same procedure as the first stage. Product C was isolated from the reaction mass by the same procedure as for Product A.

The physical and electrical properties of these three polymers are compared in Table I.

TABLE I.—PHYSICAL PROPERTIES OF POLY-(2,6-DIMETHYLPHENYLENE-1,4)ETHER

| | A | B | C |
|---|---|---|---|
| Intrinsic Viscosity | 0.50 | 0.97 | 1.45 |
| Approx. mol. wt. (by osm. pressure) | 20,000 | 45,000 | 70,000 |
| Optimum Pressing Temp., °C | 230–250 | 250–270 | 270–290 |
| Density (pressed film) | 1.07 | 1.07 | 1.06 |
| Tensile Strength, Ultimate (p.s.i.) at— | | | |
| 25° C | 15,700 | 17,500 | 15,200 |
| 150° C | 6,700 | 12,500 | 15,900 |
| 175° C | 2,900 | 11,000 | 15,200 |
| 200° C | | 5,100 | 9,800 |
| Elongation (percent) at— | | | |
| 25° C | 72 | 81 | 64 |
| 150° C | 71 | 133 | 170 |
| 175° C | 53 | 167 | 230 |
| 200° C | | 140 | 200 |
| Electrical Properties: | | | |
| 25° C. Diel. Constant (60 cycles) | 2.6 | 2.60 | 2.60 |
| Tan δ (60 cycles) | 0.0006 | 0.0007 | 0.0008 |
| D.C. Resistivity (ohm-cm.) | $1 \times 10^{18}$ | $6 \times 10^{17}$ | $1 \times 10^{18}$ |
| A.C. Resistivity (ohm-cm.) | $1 \times 10^{13}$ | $2 \times 10^{13}$ | $1 \times 10^{13}$ |
| 175° C. Diel. Const. (60 cycles) | 2.6 | 2.55 | 2.6 |
| Tan δ (60 cycles) | 0.0034 | 0.002 | 0.002 |
| D.C. Resistivity (ohm-cm.) | $9 \times 10^{13}$ | $2 \times 10^{13}$ | $9 \times 10^{14}$ |
| A.C. Resistivity (ohm-cm.) | $5 \times 10^{12}$ | $4 \times 10^{12}$ | $5 \times 10^{12}$ |

When these three polymers were subjected to saturated steam at 150° C. (4.7 atm. pressure) for three weeks the intrinsic viscosity was the same as prior to the test, indicating that the polymers are not subject to hydrolysis. This shows that such products would be very suitable for the making of sterilizable containers and envelopes. Stability is also noted when the polymers are heated for three weeks at 175° C. in a nitrogen atmosphere. Heating in oxygen at this temperature causes cross-linking of the polymer and some oxidation of the alkyl side chains.

EXAMPLE 4

Other tertiary amines can be used both as part of the catalyst and as solvents for the reaction. The process of Example 1 was repeated except that quinoline, N-methylmorpholine, α-picoline, 2,6-lutidine, tri-n-propyl amine, triethylamine, and N,N-dimethylbenzylamine were used in place of pyridine. In each case, the molecular weight and the color of the final product varied with the amine used. Lightest colored products were obtained with the monoaryl cyclic amines, e.g., pyridine, α-picoline, and 2,6-lutidine. Aliphatic monoamines are poor reaction solvents, and, therefore, the products obtained when they were used, were lower molecular weight products than those obtained with other amines.

EXAMPLE 5

The product can be precipitated from the reaction mixture of Example 1 with other precipitating agents besides the dilute hydrochloric acid used therein. The process of Example 1 was repeated except that methanol, ethanol, isopropanol, and acetone were each used as the precipitating agent in place of dilute hydrochloric acid. In each case the product precipitated as readily and was as easily filtered as the product in Example 1. The particular precipitating agent had no noticeable effect on the physical or chemical properties of the product. Although not necessary, it is usually desirable to add enough 12N aqueous HCl to the precipitant to neutralize the amine and inactivate the cuprous salt. This step aids in getting a purer product.

EXAMPLE 6

Pyridine can be combined with other solvents in producing a polymer. The results shown in Table II illustrate that the molecular weight of the polymer produced is dependent on the particular solvent system employed. Propanol is a solvent for the starting materials but a nonsolvent for the products. The molecular weight is directly proportional to the softening point and intrinsic viscosity of the polymer.

Oxygen was passed for about 10 minutes into reaction mixtures containing 10 parts of 2,6-dimethylphenol, 1 part of $Cu_2Cl_2$ and the indicated amounts of pyridine and n-propanol. During the course of the reaction, the temperature of the solutions rose from 30° C. to maximums in the range of 60–70° C. No water was removed during the reaction in which some precipitate was formed. The products were completely precipitated by pouring them into ethanol-containing hydrochloric acid, and were separated by filtration. The products had the same recurring structural unit as Example 1 but the molecular weight decreased with increasing amounts of propanol, as shown by the results of Table II.

The intrinsic viscosity is determined by dissolving the polyarylene ether in a good solvent and measuring the relative viscosity over a range of concentrations. If a good solvent has been used a plot of the viscosity-concentration data will give a straight line. Extrapolation of the line to zero concentration gives the value of the intrinsic viscosity. In general, chloroform was used as the solvent with the determination being made at 25° C.

TABLE II

| Parts by weight of solvent used | | Softening Pt. of Product | Intrinsic Viscosity |
|---|---|---|---|
| Pyridine | n-Propanol | | |
| 6.2 | 93.8 | 219° C | 0.21 |
| 12.2 | 87.8 | 235° C | 0.23 |
| 45.5 | 54.5 | Did not melt at 300° C | 0.64 | catalyst concentration and time of reaction. Table III gives the results obtained with different solvents as well as with different amines. In all cases, 2,6-dimethylphenol was the phenol oxidized.

EXAMPLE 8

This example illustrates that polymers of varying molecular weight can be separated depending on the solubility of the specific polymer in the system.

The process of Example 6 was repeated for the highest propanol to pyridine ratio except that the portion of polymer which precipitated during the reaction was separated by filtration (Precipitate I). Thereupon, the mother liquor was poured into dilute hydrochloric acid in the manner of Example 6 and the precipitate separated (Precipitate II). The mother liquor separated from Precipitate II was allowed to stand overnight and the precipitate that settled out was separated by filtration. Precipitate I had a softening point of 200° C., Precipitate II 145° C., and Precipitate III 120° C.

EXAMPLE 9

When the procedure described in Example I was repeated using other 2,6- or 2,4- substituted phenols, other

TABLE III

| Phenol, g. | CuCl, g. | Amine (ml.) | Solvent (ml.) | Temp., ° C. | | Reaction Time (min.) | Intrinsic Viscosity |
|---|---|---|---|---|---|---|---|
| | | | | Start | Max. | | |
| 50 | 2 | Pyridine (300) | Toluene (700) | 50 | 70 | ca. 10 | 0.90 |
| 10 | 1 | Pyridine (50) | o-Dichlorobenzene (50) | 30 | 73 | 5 | 0.87 |
| 10 | 1 | do | p-Methoxyethanol (50) | 30 | 75 | 4 | 0.67 |
| 10 | 1 | do | t-Amyl alcohol (50) | 30 | 72 | 5 | 0.97 |
| 10 | 1 | do | β-Acetoxyethanol (50) | 30 | 74 | 12 | 0.43 |
| 10 | 1 | do | Benzonitrile (50) | 30 | 80 | 4 | 0.48 |
| 10 | 1 | Pyridine (20) | Dimethylformamide (120) | 30 | 44 | 4.5 | 0.49 |
| 5 | 1 | Triethylamine (100) | β-Phenoxyethanol (100) | 36 | 50 | 27 | 0.35 |
| 5 | 0.1 | Dimethylstearylamine (0.1) | Dichlorobenzene (100) | 24 | 39 | 41 | 0.12 |
| 5 | 0.1 | do | Dichlorobenzene (100) plus 10 ml. dimethyl sulfoxide. | 26 | 37 | 240 | 0.78 |
| 5 | 0.1 | do | o-Dichlorobenzene (100), t-Amyl alcohol (10). | 26 | 40 | 104 | 0.44 |
| 5 | 0.1 | do | Tetrachloroethylene (100), t-Amyl alcohol (10). | 25 | 38 | 142 | 0.36 |
| 5 | 0.1 | do | Xylene (100), t-Amyl alcohol (10) | 25 | 50 | 158 | 0.47 |
| 10 | 1 | Pyridine (50) | t-Amyl alcohol (80) | 26 | 62 | 7 | 0.75 |
| 10 | 1 | Pyridine (30) | t-Amyl alcohol (50), dimethylsulfoxide (50). | 26 | 61 | 7 | 0.52 |
| 5 | 1 | Dimethylbenzylamine (30) | Nitrobenzene (100) | 31 | 50 | 32 | 0.59 |
| 5 | 1 | Tributylamine (30) | do | 32 | 48 | 31 | 0.36 |
| 10 | 1 | Pyridine (50) | t-Amyl alcohol (80) | 27 | 66 | 8 | 0.69 |
| 5 | 1 | Pyridine (75) | CH$_2$Cl$_2$ (50) | 31 | 51 | 27 | 0.88 |

EXAMPLE 7

Not only does the ratio of solvent to pyridine have an effect on molecular weight, but also the particular solvent cuprous salts or other tertiary amines, polyarylene ethers corresponding to the starting phenol were obtained. The results are summarized in Table IV.

TABLE IV

| Material Oxidized (g.) | Cuprous Salt (g.) | Pyridine, ml. | Temp., ° C. | | Reaction Time (min.) | Intrinsic Viscosity |
|---|---|---|---|---|---|---|
| | | | Start | Max. | | |
| 2,6-dimethylphenol (10) | Cu$_2$SO$_3$(1) | 100 | 90 | | 30 | 0.25 |
| Do | CuOH (1.6) | 125 | 30 | 75 | 100 | 0.19 |
| Do | CuOCCH$_3$(1.2) (O double bond) | 100 | 30 | 85 | 8 | 0.35 |
| 2,6-dimethylphenol | CuClO$_4$(1.6) | 100 | 30 | 59 | 12 | |
| 2,6-dimethylphenol (10) | CuBr (2) | 125 | 30 | 41 | 81 | 0.91 |
| 2,6-dimethylphenol (5) | CuN$_3$*(1) | 150 | 30 | 56 | 7 | 1.13 |
| 2-methyl-6-ethylphenol (5) | CuCl (1) | 100 | 30 | 56 | 8 | 0.29 |
| 2,6-diethylphenol (5) | CuCl (1) | 100 | 30 | 56 | 8 | |
| 2-methyl-6-isopropylphenol (5) | CuCl (1) | 100 | 27 | 42 | 20 | 0.24 |
| 2-chloro-6-phenylphenol (10) | CuCl (1) | 40 | Heated to 90° C. | | 153 | |
| 2-chloro-6-methylphenol (5) | CuCl (1) | 125 | Heated to 80° C. | | 31 | |
| 2-methyl-6-methoxyphenol (3) | CuCl (1) | 130 | 29 | 40 | 12 | 0.27 |
| 2-allyl-6-methylphenol (5) | CuCl (1) | 125 | 25 | 64 | 12 | |
| 2,4-dimethylphenol (10) | CuCl (1) | 100 | Ambient | 64 | 9 | |

*Calculated amount on basis of starting materials. Compound cannot be isolated since it is explosive when dry.

The first six phenols produce poly-(2,6-dimethylphenylene-1,4)ethers having the repeating unit:

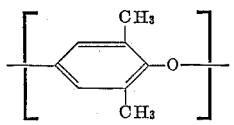

where the oxygen atom of one unit is joined directly to the phenyl nucleus of the adjacent unit, while the other phenols produce, respectively: poly-(2-methyl - 6 - ethylphenylene-1,4)ether, poly-(2,6 - diethylphenylene - 1,4)-ether, poly-(2-methyl - 6 - isopropylphenylene - 1,4)ether, poly-(2-chloro-6 - phenylphenylene - 1,4)ether, poly - (2-chloro-6-methylphenylene-1,4)ether, poly-(2 - methyl - 6 - methoxyphenylene-1,4)ether, poly-(2-allyl-6-methylphenylene-1,4)ether, and poly-(2,4 - dimethylphenylene - 1,6)ether. This last compound would have the repeating unit:

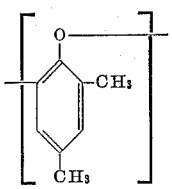

where the oxygen atom of one unit is joined directly to the phenyl nucleus of the adjacent unit, while the other materials all have repeating units similar to the poly-(2,6-dimethylphenylene-1,4)ether but whose substituents correspond to the name.

EXAMPLE 10

This example illustrates the effect of adding insoluble materials to the reaction mixture to act as modifiers. The method of Example 1 was used, except that the insoluble modifiers were filtered from the reaction mixture before the product was precipitated. The results are summarized in Table V.

The effect of vanadium pentoxide, other metal oxides, and metals, is demonstrated by the replacement of the vanadium pentoxide with an equal weight of the following metals and metallic oxides. The results are summarized in Table VI.

TABLE VI

| Material | Temp. °C. | | Intrinsic Viscosity |
|---|---|---|---|
| | Start | Max. | |
| Silver oxide | 32 | 82 | 0.45 |
| Lead monoxide | 31 | 81 | 0.53 |
| Manganese dioxide | 32 | 83 | 0.52 |
| Molybdic | 31 | 82 | 0.56 |
| Uranium oxide | 30 | 78 | 0.70 |
| Ferric oxide | 30 | 80 | 0.56 |
| Cobalt | 32 | 83 | 0.53 |
| Manganese | 30 | 83 | 0.47 |
| Lead | 29 | 79 | 0.50 |
| Gold | 30 | 80 | 0.52 |
| Mercury | 31 | 83 | 0.38 |

It will be noticed that in all cases the maximum temperature reached was higher than is normally desired. As a result the molecular weights of the products are lower than if the temperature had been controlled by cooling of the reaction mixture. For example, when the vanadium pentoxide run was repeated but the temperature controlled so that it did not exceed 47° C., the product had an intrinsic viscosity of 1.07 as compared to 0.60 without temperature control.

EXAMPLE 11

This example illustrates the effect of adding certain materials that are soluble in the reaction mixture and act as modifiers. The general procedure was the same as Example 1 except that in those cases where a water immiscible additive was present, methanol or methanol containing enough 12N hydrochloric acid to neutralize the amine was used to precipitate the polyarylene ether from the reaction mixture. The presence of the HCl in the methanol aided in removal of traces of the amine from the product, but had no effect on the product per se. The phenol oxidized was 2,6-dimethylphenol in all cases except for the first one listed in Table VII which was 2-chloro-6-methylphenol. The results are summarized in Table VII.

TABLE V

| Material Oxidized (g) | Modifier (g) | CuCl, g. | Pyridine, ml. | Temp. °C., | | Reaction Time (min.) | Intrinsic Viscosity |
|---|---|---|---|---|---|---|---|
| | | | | Start | Max. | | |
| 2,6-dimethylphenol (10) | Al₂O₃ | 1 | 100 | 30 | 56 | 23 | 0.73 |
| 2,6-dimethylphenol (5) | Pt black (0.2) | 1 | 125 | 32 | 41 | 20 | 0.92 |
| 2,3,5,6-tetramethylphenol (5) | Pt black (0.2) | 1 | 100 | 23 | 36 | 5 | |
| 2,6-dimethylphenol (10) | V₂O₅ (1) | 1 | 100 | 31 | 81 | 5 | 0.60 |

The effect of the Al₂O₃ was to produce a lighter polymer than is obtained under identical conditions without the Al₂O₃. Also, the oxidation reaction proceeds at a slower rate. Silica and activated carbon blacks give similar results except that they do not markedly affect the reaction rate. Their intrinsic viscosities were 0.68 and 0.69 respectively. The effect of the platinum black is to give higher molecular weight polymers as measured by a higher intrinsic viscosity than are obtained under identical reaction conditions in the absence of these agents. For example, 2,6-dimethylphenol gives a polymer having an intrinsic viscosity of about 0.55–0.60 while the above product made in the presence of platinum black had an intrinsic viscosity of 0.92.

TABLE VII

| Phenol, g. | CuCl, g. | Modifier (g.) | Amine (g.) | Temp., °C. Start | Temp., °C. Max. | Reaction Time (min.) | Intrinsic Viscosity |
|---|---|---|---|---|---|---|---|
| 5 | 2 | Picric acid (1) | Pyridine (125) | Heated to 70° C. | | 30 | 0.58 |
| 10 | 1 | ____do____ | ____do____ | 30 | 44 | 92 | 1.16 |
| 5 | 0.2 | Nitrobenzene (110) | Dimethylstearylamine (2) | 28 | 55 | 103 | 0.52 |
| 5 | 1 | Nitrobenzene (100), t-amyl alcohol (10) | 4-benzylpyridine (55) | 28 | 52 | 43 | 0.30 |
| 5 | 0.2 | Nitrobenzene (100), t-amyl alcohol | Diethyldodecylamine (1.5) | 24 | 50 | 185 | 0.62 |
| 5 | 0.2 | Nitrobenzene (100), t-amyl alcohol (15) | N-decylpiperidine (1.4) | 24 | 53 | 205 | 0.09 |
| 7.5 | 0.5 | Nitrobenzene (125) | Tri-n-hexylamine (4.1) | 27 | 58 | 65 | 0.34 |
| 7.5 | 1 | ____do____ | 4-n-amylpyridine (4.5) | 29 | 54 | 35 | 0.53 |
| 7.5 | 0.1 | ____do____ | 4-n-amylpyridine (0.5) | 25 | 42 | 37 | 0.12 |
| 5 | 0.2 | ____do____ | Di-n-octylmethylamine (1.0) | 26 | 32 | 37 | 0.80 |
| 5 | 1 | Trinitrobenzene (0.5) | Pyridine (125) | 29 | 51 | 8.5 | 0.8 |
| 5 | 1 | m-Dinitrobenzene (0.5) | ____do____ | 28 | 54 | 15 | 0.85 |
| 5 | 1 | p-Nitrophenol (0.5) | ____do____ | 31 | 53 | 22 | 0.82 |

The most noticeable effect of picric acid is to produce polyarylene ethers of lighter color and higher molecular weight than would be produced in its absence. The effect of nitrobenzene is to produce a polymer of lighter color. However, if both materials are present a synergistic effect is noted. For example, if 0.1 g. of hydroquinone is intentionally added to 5 g. of 2,6-dimethylphenol before it is oxidized to the polyarylene ether a pink polymer is produced if there is no modifier present. Table VIII gives a comparison with combinations of the two additives in duplicate runs using 1 g. of CuCl as the cuprous salt. The general method of Example 1 was used.

TABLE VIII

| Pyridine, ml. | Nitrobenzene, ml. | Picric Acid, g. | Reaction Time (min.) | Intrinsic Viscosity | Color of Polymer |
|---|---|---|---|---|---|
| 130 | | | 52 | 0.88 | Pink. |
| 130 | | 0.5 | 30 | 1.64 | Very light pink. |
| 30 | 100 | | 20 | 1.36 | Do. |
| 30 | 100 | 0.5 | 19 | 1.90 | Colorless. |

The synergistic action of two or more additives is also demonstrated by the results summarized in Table IX. The general method of Example 1 was used. The phenol was 5 g. of 2,6-dimethylphenol in all cases, and the cuprous salt was 1 g. of CuCl.

TABLE IX

| Pyridine, ml. | Nitrobenzene, ml. | Additives (g.) | Reaction Temp., °C. Start | Reaction Temp., °C. Max. | Reaction Time (min.) | Intrinsic Viscosity |
|---|---|---|---|---|---|---|
| 125 | | Picric acid (0.5) plus $V_2O_5$ (1) | 31 | 55 | 9 | 2.07 |
| 30 | 100 | Trinitro-m-cresol (0.2) | 29 | 51 | 22 | 1.80 |
| 30 | 100 | Trinitroresorcinol (0.2) | 31 | 51 | 20 | 1.42 |
| 30 | 100 | Trinitrofluorenone (0.2) | 31 | 52 | 22 | 1.29 |

Color in the polymeric product can also be removed with thiourea and its N- or N,N'-substituted derivatives such as methylthiourea, ethylthiourea, propylthiourea, cyclohexylthiourea, phenylthiourea, tolylthiourea, N,N'-dimethylthiourea, N,N-diethylthiourea, N,N'-diphenylthiourea, etc., and closely related compounds, e.g., thiosemicarbazide, thioamides, such as thioacetamide, thiobarbituric acid, etc. Hydrogen sulfide also is effective. The action of these compounds is illustrated by the following example.

EXAMPLE 12

Five grams of 2,6-dimethylphenol was oxidized in the manner of Example 1, in the presence of 1 g. of CuCl and 120 ml. of pyridine for five minutes. The temperature rise noted was from 30 to 48° C. When 1 g. of thiourea was added the solution became pale green in color. The poly-(2,6-dimethylphenylene-1,4)ether was precipitated by pouring the reaction mixture into ethanol. The isolated product was dissolved in chloroform, filtered and precipitated by pouring the solution into ethanol acidified with sufficient 12N hydrochloric acid to neutralize any amine present. The product was a colorless precipitate in contrast to the usual product which has a slight yellow color.

In some cases, it may be desirable to produce a polyarylene ether with a decided color. This may be done by the addition of quinones or hydroquinones to the reaction mixture prior to the oxidation to produce a product having a built-in color that cannot be removed with solvents. As illustrated above in Example 11, this color reaction may be modified to produce different shades or prevented altogether. Just as the phenols with large bulky groups in the ortho ring position cannot form polyarylene ethers, quinones, and hydroquinones having large bulky substituents on the ring cannot form colored products. Quinones and hydroquinones that have all ring positions substituted also cannot form colored compounds unless the substituent is halogen. This ability to produce built-in colors is shown by the following example. Note that other polyhydroxyphenols interact but produce only dark brown colors.

EXAMPLE 13

In all cases the phenol oxidized was 2,6-dimethylphenol. The general method of Example 1 was used. The results are summarized in Table X.

TABLE X

| Phenol, g. | CuCl, g. | Pyridine, ml. | Hydroquinone (g.) | Temp., °C. Start | Temp., °C. Max. | Reaction Time (min.) | Intrinsic Viscosity | Distinguishing Color |
|---|---|---|---|---|---|---|---|---|
| 10 | 1 | 120 | Hydroquinone (0.5) | 30 | 48 | 3.5 | 0.77 | Pink. |
| 10 | 1 | 150 | Toluhydroquinone (0.5) | 30 | 71 | 6 | 0.75 | Red orange. |
| 10 | 2 | 125 | Tetrachlorohydroquinone (1.0) | 30 | 63 | 12 | 0.53 | Orange brown. |
| 10 | 1 | 150 | 2,5-dichloroquinone (0.5) | 30 | 60 | 17 | 0.69 | Yellow-pink. |
| 10 | 1 | 150 | 2-methylnaphthoquinone-1,4(0.5) | 27 | 57 | 8 | 0.78 | Yellow. |
| 10 | 1 | 150 | 1,4-naphthoquinone (0.5) | 27 | 62 | 7 | 0.61 | Light yellow. |
| 5 | 1 | 130 | 2,5-di.t-butylhydroquinone (0.1) | 32 | 54 | 53 | 0.81 | Almost colorless. |
| 5 | 1 | 125 | 2,3,5,6-tetramethylquinone (0.1) | 30 | 50 | 13 | 0.66 | Do. |
| 10 | 1 | 125 | Catechol (1) | 30 | -------- | 12 | 0.77 | Dark brown. |
| 10 | 1 | 125 | Catechol (0.05) | 30 | -------- | 4.5 | 0.96 | Do. |
| 10 | 1 | 125 | Resorcinol (0.05) | 30 | -------- | 5.5 | 0.72 | Do. |

EXAMPLE 14

The following example illustrates the preparation of copolymers by using a mixture of phenols as the starting reactants. Oxygen was passed through a vigorously stirred solution of 100 ml. of nitrobenzene, 35 ml. of pyridine, 1 gram of cuprous chloride, and 0.2 gram of picric acid contained in a 250 ml. Erlenmeyer flask partially immersed in a water bath whose temperature was 28° C. A mixture of 4.07 grams (0.033 mole) of 2,6-dimethylphenol and 5 grams (0.038 mole) of 2,6-diethylphenol was added causing a vigorous exothermic reaction which heated the solution to a temperature of 35° C. in a period of 4 minutes. The reaction was continued for an additional 16 minutes after which the polymer was precipitated by pouring the solution into methanol, filtered and washed with methanol containing some hydrochloric acid to remove the last traces of amine. The polymer was dissolved in chloroform, filtered, and reprecipitated by pouring the solution into methanol. After filtering and drying, 7.8 grams of colorless polymer having an intrinsic viscosity of 0.48 was obtained. This polymer could be readily molded into transparent, tough, flexible films at 225° C. using a pressure of 6000 p.s.i.

Example 14 was repeated, using 2.04 grams (0.016 mole) of 2,6-dimethylphenol and 7.5 grams (0.058 mole) of 2,6-diethylphenol. The yield was 7.6 grams of a colorless polymer having an intrinsic viscosity of 0.45 which could be readily molded into transparent, tough, flexible films at 225° C. using a pressure of 6000 p.s.i.

Example 14 was repeated using 6.11 grams (0.05 mole) of 2,6-dimethylphenol and 2.5 grams (0.029 mole) of 2,6-diethylphenol. The product was 7.2 grams of colorless polymer having an intrinsic viscosity of 0.53, which could be readily molded at 225° C. using a pressure of 6000 p.s.i. into transparent, tough, flexible films.

Example 14 was repeated using 10 grams (0.076 mole) of 2,6-diethylphenol. The yield was 8.1 grams of a colorless polymer having an intrinsic viscosity of 0.39 which could be molded to produce a tough, transparent, flexible film at 180° C. using a pressure of 5000 p.s.i.

EXAMPLE 15

The following examples illustrate ways in which polyarylene ethers may be made from phenols having more than one reactive position. The general procedure was as in Example 1 as to the making up of the reaction mixture passing in oxygen, and isolating the product. In some cases it will be noticed that the reaction had to be heated to initiate the reaction. In those cases where a solid modifier was present the solid was filtered from the solution before the polyarylene ether was precipitated. The results are summarized in Table XI.

TABLE XI

| Phenol (g.) | CuCl, g. | Amine (g.) | Solvent, ml. | Modifier | Start | Max. | Time | Intrinsic Viscosity |
|---|---|---|---|---|---|---|---|---|
| Guaiacol (10) | 1 | 2-benzyl pyridine (5.2). | Trichloroethylene (40). | 0.1 g. picric acid | 30 | 45 | 91 | 0.1 |
| Phenol (75) | 1 | 2-methyl-6-undecyl pyridine (5). | s-Tetrachloroethane (150). | do | 70 | -------- | 310 | 0.2 |
| o-Cresol (5) | 1 | 2-(5-nonyl)pyridine (6.2). | Nitrobenzene (100), t-amyl alcohol (10). | | 26 | 50 | 180 | 0.39 |
| o-Phenylphenol (10) | 1 | 2-benzylpyridine (5.1) | Nitrobenzene (125) | | 150 | -------- | 155 | 0.11 |
| m-Phenyl phenol (50) | 5 | s-Collidine (25 ml.) | s-Tetrachloroethane (250). | | 91 | -------- | 111 | 0.06 |
| o-Cresol (75) | 1 | 2-amylpyridine (3) | s-Tetrachloroethane (15). | 4.2 MgSO₄ (anh.) | 29 | 47 | 86 | 0.26 |
| Do | 1 | do | s-Tetrachloroethane (125). | 4.29 MgSO₄ plus 1 g. 5% platinum on carbon. | 29 | 46 | 107 | 0.42 |
| Do | 1 | do | do | 4.2 g. MgSO₄ plus 1 g. 5% palladium on carbon. | 29 | 40 | 114 | 0.44 |
| o-Cresol (5) | 1 | 2-(5-nonyl)pyridine (6.2). | do | 5% platinum on carbon (1). | 28 | 32 | 1,240 | 0.42 |
| o-Cresol (7.5) | 1 | 2-amylpyridine (3) | do | do | 30 | 50 | 83 | 0.48 |
| o-Cresol (15) | 2 | 2-ethylpyridine, 100 ml. | | | 30 | 98 | 9 | 0.14 |
| Do | 3 | 2-(5-nonyl)pyridine (18.5). | Phenylcellosolve (70), benzonitrile (30). | | 50 | -------- | 94 | 0.3 |
| o-Chlorophenol (15) | 1 | 2-amylpyridine (3) | Tetrachloroethane (125), phenylcellosolve (65). | 5% platinum on carbon (1). | 50 | -------- | 145 | 0.24 |
| Do | 1 | do | do | 5 ml. (2% isopropylvanadate in isopropanol). | 95 | -------- | 135 | 0.25 |
| Do | 1 | do | do | | 98 | -------- | 60 | 0.12 |
| Do | 3 | 2-(5-nonyl) pyridine (18.5). | Phenylcellosolve (70), benzonitrile (30). | | 90 | -------- | 137 | 0.21 |
| o-Cresol (7.5) | 1 | N-isobutylpyrrolidine (2.6). | s-Tetrachloroethane (135). | 5% platinum on carbon (1) anh. MgSO₄ (4). | Ambient | -------- | 420 | 0.20 |

Similar polymers to the last one listed in Table XI were obtained when o-cresol was oxidatively polymerized using each of the following amines individually in place of the N-isobutylpyrrolidine: N-decylpiperidine; N-decylpyrrolidine; N-isobutylpiperidine; 1-decyl-2-methylpiperidine; N-isopropylpyrrolidine; and N-cyclohexylpiperidine.

The product from guaiacol (o-methoxyphenol) was poly-(2-methoxyphenylene-1,4) ether, from phenol-polyphenylene-1,4 ether, from o-cresol-poly-(2-methylphenylene-1,4) ether, from o-phenylphenol-poly-(2-phenylphenylene-1,4) ether, from m-phenylphenol-poly-(3-phenylphenylene-1,4) ether, and from o-chlorophenol-poly-(2-chlorophenylene-1,4) ether. All of these materials have repeating units of the same general structure:

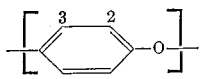

where the numbers in brackets denote the position of the substituent when given in the above names.

Examples 16–20 illustrate the use of aliphatic tertiary polyamines in the preparation of polymers. It will be noted that when o-cresol is the starting phenol, I use a polyamine in which the alkyl groups are bulky, in order to obtain higher molecular weights than would be obtained if the alkyl groups were smaller in size. However, the latter can be used, as illustrated in Examples 20 and 21, as well as the former, for producing polymers or diphenoquinones from xylenols, such as the 2,6-disubstituted phenols, as illustrated by 2,6-dimethylphenol.

EXAMPLE 16

Oxygen was bubbled through a vigorously stirred solution of 0.5 gram (0.005 mole) of cuprous chloride, 2 grams (0.005 mole) of N,N,N',N'-tetra-n-hexylethylenediamine, 4 grams of anhydrous magnesium sulfate, 0.5 gram of platinum absorbed on carbon black, and 135 ml. of o-dichlorobenzene. An exothermic reaction occurred when 7.5 grams (0.07 mole) of o-cresol was added. Over a period of 30 minutes, the temperature of the reaction mixture rose from 29° C. to 51° C. After an additional 30 minutes, the exothermic reaction had subsided. The polymer was precipitated by pouring the reaction mixture into methanol containing a small amount of hydrochloric acid. The isolated precipitate was dissolved in chloroform, the solution filtered, and the polymer reprecipitated by addition of methanol to the solution. After filtering and drying, 6.6 grams of polymer having an intrinsic viscosity of 0.195 was obtained.

EXAMPLE 17

Oxygen was bubbled through a vigorously stirred solution of 0.5 gram (0.005 mole) of cuprous chloride and 1 gram (0.0005 mole) of 1,2-bispiperidinoethane, 4 grams of anhydrous magnesium sulfate, 0.5 gram of platinum absorbed on carbon black, and 130 ml. of o-dichlorobenzene. The solution was heated to 30° C. in a water bath and 7.5 grams of o-cresol were added. Over a period of 8 minutes, the temperature of the reaction mixture rose to 37° C. After an additional 16 minutes the reaction subsided and the polymer was isolated and purified as described in Example 16. A yield of 6.2 grams of polymer having an intrinsic viscosity of 0.12 and a melting point greater than 300° C. was obtained.

When Example 16 was repeated, but using 100 ml. of o-dichlorobenzene and 30 ml. of phenylcellosolve as solvent and omitting the magnesium sulfate and platinum absorbed on carbon black, a yield of 6 grams of polymer was obtained having an intrinsic viscosity of 0.17 and a melting point greater than 300° C.

EXAMPLE 18

While oxygen was passed through the vigorously stirred solution, 7.5 grams (0.07 mole) of o-cresol was added to a solution of 1 gram (0.01 mole) of cuprous chloride, 3.7 grams (0.01 mole) of N,N-didecyl-N',N'-dimethylethylenediamine, 4 grams of anhydrous magnesium sulfate and 135 ml. of o-dichlorobenzene. The exothermic reaction which occurred caused the temperature of the reaction mixture to rise over a period of 20 minutes from 30° C. to 56.5° C. After 20 more minutes, the reaction had subsided and the polymer was isolated as described in Example 16, to yield 6.0 grams of polymer having an intrinsic viscosity of 0.075 and a melting point of 300° C.

EXAMPLE 19

Oxygen was bubbled through a vigorously stirred solution of 135 ml. of nitrobenzene, 1 gram (0.01 mole) of cuprous chloride, and 2.3 grams (0.01 mole) of N-methyl-N',N',N'',N''-tetraethylenediethylenetriamine and 5 grams (0.041 mole) of 2,6-dimethylphenol. An exothermic reaction occurred causing the temperature to rise from 30° C. to 40° C. over a period of 20 minutes. After a further 30 minutes of reaction, the temperature had returned to room temperature. The polymer was isolated as in Example 16 to yield 4.75 grams of a colorless polymer having an intrinsic viscosity of 0.395.

The tertiary diamines with small substituents on the nitrogen atom are particularly attractive for the oxidation of 2,6-disubstituted phenols because they give very soluble catalysts and have low equivalent weights. Since they contain two amino groups, only one mole of the amine per mole of cuprous salt is necessary for an active catalyst. A variation of an oxidation of 2,6-dimethylphenol, wherein the polymer precipitates from the reaction mixture, is illustrated in the following example.

EXAMPLE 20

While oxygen was passed through the vigorously stirred solution, 50 grams of 2,6-dimethylphenol were added to a solution of 1 gram (0.01 mole) of cuprous chloride, 1.5 grams (0.01 mole) of N,N,N',N'-tetramethyl-1,3-butanediamine, 125 ml. of isopropanol, and 125 ml. of xylene. Over a period of 22 minutes, the temperature rose from 30° C. to 44° C. and the polymer had started to precipitate from the solution. After an additional 25 minutes, the exothermic reaction had completely subsided, the precipitate was filtered from the solution and washed with methanol containing a small amount of hydrochloric acid. It was further purified by suspending the polymer in hot methanol and a small amount of 85% aqueous hydrazine hydrate was added to reduce the small amount of 3,3',5,5'-tetramethyldiphenoquinone that was formed. The polymer was isolated by filtering and after drying weighed 44.7 grams. It was almost colorless and had an intrinsic viscosity of 0.42. The polymer could be readily molded into transparent, almost colorless, films at 260° C. using a pressure of 5000 p.s.i.

When Example 20 was repeated using 1.16 grams of N,N,N',N'-tetramethylethylenediamine in place of the N,N,N',N'-tetramethyl-1,3-butanediamine, a similar polymer was obtained.

The aliphatic tertiary polyamines may also be used in the preparation of catalysts, for the preparation of diphenoquinones from phenols. These polyamines are particularly useful when preparing diphenoquinones from phenols having large, bulky groups as substituents, since they permit the use of ratios of over 100 moles of phenol per mole of catalyst which makes the reaction readily adaptable to a continuous process and reduces the catalyst cost to a negligible amount.

EXAMPLE 21

Oxygen was passed through a vigorously stirred solution of 300 ml. of t-butanol, 0.2 gram (0.002 mole) of cuprous chloride, and 0.24 gram (0.002 mole) of N,N,N',N'-tetramethylethylenediamine contained in a 500 ml. Erlenmeyer flask partially immersed in a water bath whose temperature was 32° C. After the catalyst had dissolved, 50 grams (0.242 mole) of 2,6-di-t-butylphenol was added. Over a period of 18 minutes, the temperature of the reaction mixture rose to 43.5° C.

After 23 minutes, the reaction subsided and a brown solid had precipitated. The product was removed by filtration and washed twice with 50 ml. portions of t-butanol containing about 1 ml. of concentrated hydrochloric acid. After drying in vacuo, 48.7 grams of a solid having a melting point of 245° C. was obtained. Dilution of the filtrate with an equal portion of water gave an additional 0.6 gram of solid. When a 20-gram portion of this product was recrystallized from 200 ml. of acetic acid in a Soxhlet apparatus there was obtained 19.1 grams of red-brown crystals having a metallic sheen and melting at 245° C. The total yield after recrystallization was 47.1 grams (0.115 mole; 95%) of 3,3′,5,5′-tetra-t-butyldiphenoquinone-4,4′.

In addition to the aliphatic tertiary polyamines used in Examples 16–21, the following amines have also been used in comparable reactions to obtain similar products: N-ethyl-N,N′,N′-trimethylethylenediamine; N-methyl-N,N′,N′-triethylethylenediamine; N,N,N′,N′-tetramethyl-1,3-propanediamine; N,N,N′,N′-tetraethylethylenediamine; N,N-dimethyl-N′,N′-diethylethylenediamine; 1,2-bis(2-methylpiperidine)ethane; N,N,N′,N′-tetra-n-amylethylenediamine; N,N,N′,N′-tetraisobutylethylenediamine; 1,2-bis(2,6-dimethylpiperidino)ethane; N-decyl-N,N′,N′-triethylethylenediamine; 2-(β-piperidinoethyl)pyridine; 2-(β-dimethyl aminoethyl)-6-methylpyridine; 2-(β-dimethylaminoethyl)pyridine; and 2-(β-morpholinoethyl)pyridine.

EXAMPLE 22

The following example also illustrates the formation of diphenoquinones by the oxidation of phenols by my process. Group A in Table XII represents typical phenols which have such large bulky groups in the ortho position that they sterically hinder the formation of the polyarylene ethers. Group B represents typical phenols which ordinarily would form polyarylene ethers but because the water of reaction is removed as it is formed, the polymer reaction is hindered and diphenoquinones result. In both groups the diphenoquinone products have substituents corresponding to the phenol starting material. Where water was removed it was done by carrying out the reaction at reflux and using a Stark and Dean trap to separate the water from the condensate before the latter returns to the reaction vessel. In other respects the general procedure of Example 1 was used.

below the temperature at which there is any substantial volatilization of the other components of the solution.

A vigorously stirred solution of 1 g. of cuprous chloride and 3.6 g. of phenanthridine in 135 ml. of nitrobenzene contained in an open 250 ml. flask was heated in a steam bath at atmospheric pressure and 5 g. of 2,6-dimethylphenol was added. Oxygen was passed through the heated solution for 40 minutes. On cooling, 4.0 grams (81% of theory) of 3,3′,5,5′-tetramethyldiphenoquinone-4,4′ (melting point 216–217° C.) separated out as red crystals which were isolated by filtration.

When this reaction was repeated using an equivalent amount of 3,5-diphenylpyridine as the ligand in place of the phenanthridine, a yield of 4.1 grams (83% of theory) of 3,3′,5,5′-tetramethyldiphenoquinone-4,4′ (melting point 216–217° C.) was obtained.

The diphenoquinone produced from 2-methyl-6-t-butylphenol is 3,3′-dimethyl-5,5′-di-t-butyldiphenoquinone-4,4′; from 2,6-dimethoxyphenol-3,3′,5,5′-tetramethoxydiphenoquinone-4,4′; from 2,6-diphenylphenol-3,3′,5,5′-tetraphenyldiphenoquinone-4,4′; from 2,6-di-t-butylphenol-3,3′,5,5′-tetra-t-butyldiphenoquinone-4,4′; from 2,6-diisopropylphenol-3,3′,5,5′-tetraisopropyldiphenoquinone-4,4′; and from 2,6-dimethylphenol-3,3′,5,5′-tetramethyldiphenoquinone-4,4′.

These diphenoquinones have the structural formula

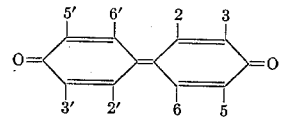

where the numbers show the position where the substituents in the above named products are attached.

Carbon and hydrogen analyses of these materials agree well with the theoretical values as shown in Table XIII.

TABLE XIII

| Diphenoquinone | C | | H | |
|---|---|---|---|---|
| | Found | Theoretical | Found | Theoretical |
| 3,3′,5,5′-tetra-t-butyldiphenoquinone-4,4′ | 82.7 | 82.30 | 9.8 | 9.87 |
| 3,3′,5,5′-tetramethyldiphenoquinone-4,4′ | 79.6 | 79.97 | 7.0 | 6.71 |
| 3,3′,5,5′-tetraisopropyldiphenoquinone-4,4′ | 82.1 | 81.77 | 9.3 | 9.15 |

TABLE XII.—GROUP A

| Phenol (g.) | Cuprous Salt (g.) | Pyridine, ml. | Reaction Temp., ° C. Start | Reaction Temp., ° C. Max. | Reaction Time | Color | Melting Point, ° C. |
|---|---|---|---|---|---|---|---|
| 2-methyl-6-t-butylphenol (5) | CuCl (1) | 100 | 27 | 44 | 20 | Orange | 210 |
| 2,6-dimethoxyphenol (10) | CuCl (1) | 150 | R.T. | | 20 | Purple | 300 |
| 2,6-diphenylphenol (5) | CuCl (1) | 100 | R.T. | | 60 | Red | |
| 2,6-di-t-butylphenol (100) | CuCl (5) | 500 | 27 | 83 | 32 | Deep red needles with metallic sheen. | 246–246.5 |
| 2,6-di-t-butylphenol (10) | CuOCCH₃ (1) | 100 | 27 | 61 | 30 | do | 246–246.5 |
| 2,6-diisopropylphenol (89) | CuCl (5) | 500 | 27 | 92 | 22 | Deep rose | 211–212 |
| 2,6-diisopropylphenol (10) | Cu₂SO₃ (1) | 100 | Heated to 90° | | 60 | do | 211–212 |
| Do | CuCl (1) | 2,6-lutidine (100) | Heated to 90° | | 80 | do | 211–212 |

GROUP B

| Phenol (g.) | Cuprous Salt (g.) | Pyridine, ml. | Reaction Temp. | Reaction Time | Color | Melting Point, ° C. |
|---|---|---|---|---|---|---|
| 2,6-dimethylphenol (10) | CuCl (1) | Pyridine (5), Nitrobenzene (100). | 90 | 10 | Red | 216–217 |
| 2,6-dimethylphenol (20) | CuCl (2) | Pyridine (10), methylpropyl ketone (200). | Reflux | | do | 216–217 |
| Do | CuCl (2) | Pyridine (10), n-nitropropane (200). | Reflux | | do | 216–217 |
| Do | CuCl (2) | Benzene (100), pyridine (5), nitrobenzene (100). | Reflux | | do | 216–217 |

EXAMPLE 23

Diphenoquinones may also be made by carrying out the oxidation reaction in an open vessel at a temperature which causes the water to vaporize as it is formed but below the temperature at which there is any substantial The diphenoquinones can be reduced with hydrogen in the presence of a hydrogenation catalyst, hydrazine, metallic zinc and acid, etc., to produce the corresponding biphenols. For example, when the 3,3′,5,5′-tetra-t-butyldiphenoquinone-4,4' was reduced by heating in the presence of zinc dust and acetic acid, the product obtained as pale yellow neeedles was 3,3',5,5'-tetra-t-butyl-4,4'-dihydroxybiphenyl having a melting point of 186° C. after recrystallization from acetic acid. It analyzed for 81.2% carbon and 10.6% hydrogen in comparison to the theoretical values of 81.9% carbon and 10.31% hydrogen.

As stated previously, intrinsic viscosity is indicative of molecular weight. However, it is a relative rather than specific measurement. Table XIV gives some of the relationships which have been determined.

TABLE XIV

| Polyarylene Ether | Intrinsic Viscosity | Molecular Weight by— | |
|---|---|---|---|
| | | Osmotic Pressure (Chloroform solvent, 25.0° C.) | Light Scattering |
| Poly(2,6-dimethyl-1,4-phenylene)ether | 0.185 | 16,500 | 114,000 |
| | 2.04 | 165,000 | 678,000 |
| Poly(2-methyl-1,4-phenylene)ether | 0.19 | 44,000 | 382,000 |
| | 0.45 | 63,000 | 2,150,000 |
| Poly(1,4-phenylene)ether | 0.20 | 80,000 | 6,100,000 |
| | 0.115 | 58,000 | |
| | 0.095 | 41,000 | 710,000 |
| | 0.085 | 28,000 | |
| | 0.070 | 18,500 | 66,000 |
| Poly(2-phenyl-1,4-phenylene)ether | 0.15 | 47,700 | 1,220,000 |
| Poly(2-chloro-1,4-phenylene)ether | 0.24 | 82,000 | 5,400,000 |

EXAMPLE 24

This example shows that cupric salts may be used to prepare the tertiary amine-copper complex if they are converted into the basic cupric salt form and compares the polymer obtained with the polymer obtained under identical reaction conditions when the complex is formed from a cuprous salt. Oxygen was passed through a vigorously stirred solution of 1 gram of cuprous chloride, 100 ml. of nitrobenzene, 30 ml. of pyridine and 10 ml. of ethanol. After the cuprous chloride had completely dissolved, 5 grams of 2,6-dimethylphenol were added. Over a period of 6 minutes the temperature rose from 26° to 43° C. where the reaction mixture became viscous. After an additional 4 minutes reaction the temperature decreased indicating that the reaction was complete. The reaction mixture was poured into methanol to precipitate the polymer which was filtered from the solution and washed with methanol containing a small amount of hydrochloric acid. The polymer was dissolved in chloroform, filtered and reprecipitated in methanol yielding 4.3 grams of colorless polymer having an intrinsic viscosity of 0.87. When the reaction was repeated substituting 1.7 grams of cupric chloride dihydrate for the cuprous chloride, no reaction occured during a 3-hour reaction period. Likewise, no reaction occurred when 1 gram of cupric hydroxide was substituted for the cuprous chloride. However, when the reaction was repeated and the 1.7 grams of cupric chloride dihydrate was treated with 0.56 gram of potassium hydroxide dissolved in 5 ml. of ethanol, the reaction proceeded rapidly with the temperature rising from 27 to 43° C. in a period of 9 minutes and after an additional 2 minutes, the temperature subsided, after which the polymer was precipitated yielding 4 grams of a polymer having an intrinsic viscosity of 1.05. Likewise, when the reaction was repeated, utilizing in one case 1 gram of cupric hydroxide and 0.81 ml. of 12 molar hydrochloric acid and in the other case 0.5 gram of cupric hydroxide and 0.85 gram of cupric chloride dihydrate, as the source of the copper complex, a polymer was obtained in each case having an intrinsic viscosity of 1.04 and 0.93, respectively. In these latter two reactions, there was an initial induction period presumably while the catalyst was equilibrating, after which the reaction was as rapid as that obtained either with the use of cuprous chloride or the cupric chloride treated with the potassium hydroxide.

When the reaction was repeated using 2 grams of cupric acetate monohydrate as the source of copper, the reaction was much slower requiring a period of 40 minutes before the exotherm subsided, and the polymer had an intrinsic viscosity of 0.3. However, when the cupric acetate was treated with 0.56 gram of potassium hydroxide dissolved in 5 ml. of ethanol, the temperature rose more rapidly, taking only 25 minutes before the exotherm subsided and the polymer had an intrinsic viscosity of 0.45.

EXAMPLE 25

This example illustrates how all of the oxygen can first be reacted with a tertiary amine-cuprous salt complex to produce the tertiary amine-basic cupric salt complex and the oxidized complex used in the ratio of 2 moles of copper for each mole for phenol to be oxidized. Oxygen was passed into a vigorously stirred solution of 20 grams of cuprous chloride in 200 ml. of pyridine for a period of 15 minutes, after which the reaction flask was flushed with nitrogen with vigorous stirring for an additional 15 minutes. 12.2 grams of 2,6-dimethylphenol were added with the reaction mixture kept under nitrogen. During a period of 35 minutes, the temperature rose to 47° and then subsided. The polymer was precipitated by pouring the reaction mixture into methanol containing a slight amount of hydrochloric acid, filtered and washed with methanol, dissolved in chloroform, filtered, and reprecipitated by pouring into methanol. The yield was 11.3 grams of polymer having an intrinsic viscosity of 0.75.

EXAMPLE 26

This example illustrates the synergistic effect obtained in a non-polar solvent obtained by using a mixture of a polyamine and a monoamine. Oxygen was passed through a vigorously stirred solution containing 0.1 gram of cuprous chloride, 0.12 gram of N,N,N',N'-tetramethylethylenediamine, 110 ml. of toluene and 5 grams of anhydrous magnesium sulfate, contained in a 250 ml. widemouth Erlenmeyer flask immersed in a constant temperature bath heated at 30° C. A solution of 10 grams of 2,6-dimethylphenol in 20 ml. of toluene was added over a 30-minute period. After an additional 30 minutes, the reaction mixture was filtered to remove the magnesium sulfate and the polymer precipitated by pouring the reaction mixture into methanol containing 1 ml. of concentrated hydrochloric acid. The polymer was removed by filtration and dried in vacuum. It had an intrinsic viscosity of 0.28. In this example, there were two equivalents of amine nitrogen per mole of copper, and a copper-to-phenol ratio of 1.83.

From my tests, I have observed that in any particular system, increasing either the copper-to-phenol ratio or increasing the amine-to-copper ratio has a favorable effect and increases the molecular weight of the polyphenylene ether and increases the reactivity of the system. The above test was repeated, using 0.2 gram of cuprous chloride and 0.48 grams of N,N,N',N'-tetramethylethylenediamine. This gives a copper-to-phenol ratio of 1:41.5, and eight equivalents of amine nitrogen per mole of copper. The polymer obtained had an intrinsic viscosity of 0.38.

The above example was repeated again, using 0.1 gram of cuprous chloride and varying the amount of N,N,N',N'-tetramethylethylenediamine and trimethylamine as shown in Table XV, wihch also includes for comparison purposes the same data on the above two polymers.

TABLE XV

| Grams CuCl | Grams N,N,N',N'-tetramethylethylenediamine | Grams trimethylamine | Equivalents of amine nitrogen per mole of Cu | Intrinsic Viscosity |
|---|---|---|---|---|
| 0.1 | 0.12 | -------- | 2 | 0.28 |
| 0.2 | 0.48 | -------- | 8 | 0.38 |
| 0.1 | 0.12 | 0.06 | 3 | 0.42 |
| 0.1 | 0.06 | 0.12 | 3 | 0.51 |
| 0.1 | 0.12 | 0.12 | 4 | 0.56 |
| 0.1 | 0.12 | 0.36 | 8 | 0.95 |

From the above table, it is obvious that the trimethylamine has a synergistic effect since it not only permits less total amine to be used, but also a lower copper-to-phenol ratio and yet at the same time obtain a polyphenylene ether product which has a higher intrinsic viscosity than can be obtained with the polyamine itself.

EXAMPLE 27

This example illustrates carrying out the reaction in a solvent system which permits the polymer to precipitate during the reaction. Oxygen was passed through a vigorously stirred solution containing 0.1 gram of cuprous chloride, 0.12 gram of N,N,N',N'-tetramethylethylenediamine, 0.36 gram of trimethylamine, 77 ml. of benzene, 43 ml. of n-heptane and 5 grams of anhydrous magnesium sulfate, in a reaction flask immersed in a constant temperature bath at 20° C. 10 grams of 2,6-dimethylphenol dissolved in 13 ml. of benzene and 7 ml. of n-heptane was added over an 8-minute period. An exothermic reaction occurred in which the temperature of the reaction mixture rose to 34° C. over the 8-minute period. After an additional 6 minutes, the temperature had decreased to 26° C. and the polymer had started to precipitate from the reaction mixture. The reaction was allowed to continue for an additional 40 minutes and the polymer filtered from the reaction mixture, and washed with methanol containing a slight amount of hydrochloric acid. The polymer was then washed with acetone and then the magnesium sulfate was dissolved by washing with water. There was obtained 7.8 grams of a white polymer having an intrinsic viscosity of 0.49, which was molded at 300° C. to produce a colorless, clear film.

EXAMPLE 28

This example shows the preparation of 4-bromo-2,6-dimethoxyphenol and its oxidation to poly-(2,6-dimethoxy-1,4-phenylene)ether. To a solution of 100 grams of 2,6-dimethoxyphenol in 250 ml. of acetic acid in an ice bath was added 104 grams of bromine. Water was added leaving an oil which was taken up in ether and washed with sodium bicarbonate solution. The ether solution was dried, filtered and evaporated to leave an oil which did not crystallize on standing.

Oxygen was bubbled through a pyridine solution containing 3 grams of cuprous chloride and 5 grams of N,N,N',N'-tetramethylethylenediamine. There was added 6 grams of the crude 4-bromo-2,6-dimethoxyphenol. The temperature of the reaction mixture rose to 45° C. The polymer was precipitated by pouring the reaction mixture into methanol and washed with methanol containing some HCl. There was obtained a light yellow, fibrous solid having an intrinsic viscosity of 0.25 that could be cast from CHCl₃ into a tough, flexible film.

Because of their excellent physical, mechanical, chemical, electrical and thermal properties, the polymers of this invention have many and varied uses. For example, they can be used in molding powder formulations, either alone or mixed with other polymers and may contain various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, magnetic tapes, photographic films, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics, useful in many applications, for example, as filter cloths where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

The non-polymeric products exhibit the same utility as the same compounds prepared by any other method. Thus, the quinones and diphenoquinones can be used as dyes, etc., and in the reduced form as antioxidants. In addition, these compounds can be used as chemical intermediates in the preparation of other materials, such as polymers. For example, the diphenoquinones can be reduced to dihydroxy compounds of the bis-phenol type which are useful in preparing epoxide, polyester, polycarbonate, etc., resins.

Obviously, other modifications and variations of the present invention are possible in the light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. The process of forming self-condensation products of phenols which comprises reacting oxygen with a phenol having the structural formula

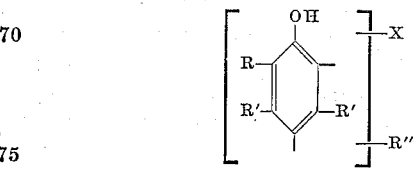

where X is a substituent selected from the group consisting of hydrogen, chlorine, bromine and iodine; R is a monovalent substituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atom and phenol nucleus, R' and R" are the same as R and in addition, halogen, using as the oxygen-carrying intermediate, a solution of a tertiary amine-basic cupric salt complex in which the said phenol is soluble.

2. The process of forming self-condensation products of phenols which comprises reacting oxygen with a phenol having the structural formula

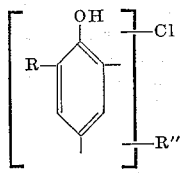

where R and R" are monovalent hydrocarbon radicals, using as the oxygen-carrying intermediate, a solution of a tertiary amine-basic cupric salt complex in which the said phenol is soluble.

3. The process of preparing self-condensation products of phenols which comprises reacting oxygen with 2-chlorophenol using as the oxygen-carrying intermediate, a solution of a tertiary amine-basic cupric salt complex in which the said phenols are soluble.

4. The process of forming self-condensation products of phenols which comprises reacting oxygen with a phenol having the structural formula

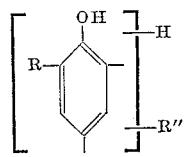

where R' and R" are monovalent hydrocarbon radicals, using as the oxygen-carrying intermediate, a solution of a tertiary amine-basic cupric salt complex in which the said phenol is soluble.

5. The process of claim 4 wherein R is phenyl and R" is methyl.

6. The process of claim 4 wherein the phenol is 2,6-dimethylphenol.

7. The process of making self-condensation products of phenols which comprises reacting oxygen with a phenol corresponding to the formula

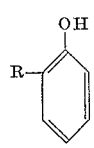

where R is a monovalent hydrocarbon radical, using as the oxygen-carrying intermediate, a solution of a tertiary amine-basic cupric salt complex in which the said phenols are soluble.

8. The process of claim 7 wherein the phenol is 2-phenylphenol.

9. The process of claim 7 wherein the phenol is 2-methylphenol.

10. The process of making self-condensation products of phenol which comprises reacting oxygen with phenol, using as the oxygen-carrying intermediate, a solution of a tertiary amine-basic cupric salt complex in which the said phenol is soluble.

11. The process of oxidizing phenols to diphenoquinones which comprises reacting oxygen with a phenol having the structural formula

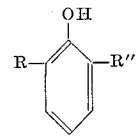

where R and R" are monovalent hydrocarbon radicals, using as the oxygen-carrying intermediate, a solution of a tertiary amine-basic cupric salt complex in which the said phenol is soluble, and continuously removing substantially all of the water as it is formed during the oxidation reaction.

12. The process of preparing 3,3',5,5'-tetramethyl diphenoquinone-4,4' which comprises reacting oxygen with 2,6-dimethylphenol, using as the oxygen-carrying intermediate, a solution of a tertiary amine-basic cupric salt complex in which the said phenol is soluble, and continuously removing substantially all of the water as it is formed during the oxidation reaction.

13. The process of preparing diphenoquinones which comprises reacting oxygen with a phenol having the structural formula

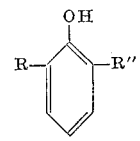

where R and R" are monovalent hydrocarbon radicals with the proviso that at least R is a monovalent hydrocarbon radical having an aliphatic, tertiary, α-carbon atom, using as the oxygen-carrying intermediate, a solution of a tertiary amine-basic cupric salt complex in which the said phenols are soluble.

14. The process of claim 13 wherein R and R" are each a monovalent hydrocarbon radical having an aliphatic, tertiary, α-carbon atom.

15. The process of preparing 3,3',5,5'-tetra-t-butyldiphenoquinone-4,4' which comprises reacting oxygen with 2,6-di-t-butylphenol, using as the oxygen-carrying intermediate, a solution of a tertiary amine-basic cupric salt complex in which the said phenol is soluble.

16. The process of preparing diphenoquinones which comprises reacting oxygen with a phenol having the structural formula

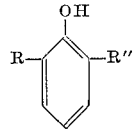

wherein R and R" are each a monovalent hydrocarbon radical having an aliphatic, secondary α-carbon atom, using as the oxygen-carrying intermediate, a solution of a tertiary amine-basic cupric salt complex in which the said phenol is soluble.

17. The process of preparing 3,3',5,5'-tetraisopropyldiphenoquinone-4,4' which comprises reacting oxygen with 2,6-diisopropylphenol, using as the oxygen-carrying intermediate, a solution of a tertiary amine-basic cupric salt complex in which the said phenol is soluble.

18. The process of preparing a dihydroxybiphenyl from a monohydric monocyclic phenol which comprises reacting oxygen with a phenol having the structural formula

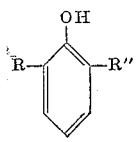

where R and R'' are each a monovalent hydrocarbon radical with the proviso that at least R is a monovalent hydrocarbon radical having an aliphatic, tertiary, α-carbon atom, using as the oxygen-carrying intermediate, a solution of a tertiary amine-basic cupric salt complex in which the said phenol is soluble, thereby producing a diphenoquinone having the formula

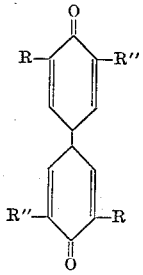

and thereafter reducing said diphenoquinone to a dihydroxydiphenyl compound having the formula

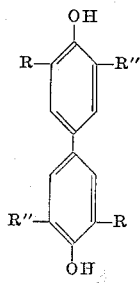

wherein R and R'' of both the diphenoquinone and dihydroxybiphenyl correspond to the R and R'' of the starting phenol.

19. The process of preparing 3,3',5,5'-tetra-t-butyl-4,4'-dihydroxybiphenyl which comprises reacting oxygen with 2,6-di-t-butylphenol, using as the oxygen-carrying intermediate, a solution of a tertiary amine-basic cupric salt complex in which the said phenol is soluble, and thereafter reducing the 3,3',5,5'-tetra-t-butyldiphenoquinone-4,4', produced thereby, to the corresponding 3,3',5,5'-tetra-t-butyl-4,4'-dihydroxybiphenyl.

20. The process of preparing polyphenylene ethers which comprises reacting oxygen with a phenol having the structural formula

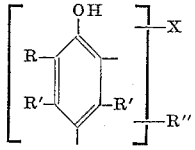

where X is a substituent selected from the group consisting of hydrogen, chlorine, bromine and iodine, R is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, R' and R'' are the same as R and in addition, halogen, with the provisos that R, R' and R'' are each free of a tertiary α-carbon atom, and X must be a halogen when R'' is in the ortho position and R and R'' are each a substituent selected from the group consisting of aryl radicals, haloaryl radicals, hydrocarbonoxy radicals, and halohydrocarbonoxy radicals, using as the oxygen-carrying intermediate, a solution of a tertiary amine-basic cupric salt complex in which the said phenol is soluble.

21. The process of preparing polyphenylene ethers which comprises reacting oxygen with a phenol having the structural formula

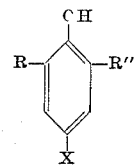

where X is a monovalent substituent selected from the group consisting of hydrogen, chlorine, bromine and iodine, and R and R'' are each monovalent hydrocarbon radicals with the provisos that R and R'' are free of tertiary α-carbon atoms and X must be halogen when R and R'' are both aryl radicals, using as the oxygen-carrying intermediate, a solution of a tertiary amine-basic cupric salt complex in which the said phenol is soluble.

22. The process of claim 21 wherein R and R'' are each an alkyl radical free of a tertiary α-carbon atom and X is hydrogen.

23. The process of claim 21 where R and R'' are each methyl and X is hydrogen.

24. A polyphenylene ether having a repeating structural unit of the formula

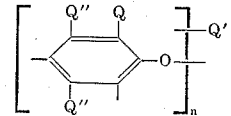

wherein the oxygen atom of one unit is connected to the benzene nucleus of the adjoining unit, $n$ is a positive integer and is at least 100, Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals being free of a tertiary α-carbon atom, and halohydrocarbonoxy radicals having at least two carbon atoms between the halogen atom and phenol nucleus and being free of a tertiary α-carbon atom, Q' and Q'' are both monovalent substituents which are the same as Q and in addition, halogen.

25. A polyphenylene ether of claim 24 wherein Q and Q' are each an aliphatic hydrocarbon radical free of a tertiary α-carbon atom and Q'' is hydrogen.

26. A polyphenylene ether of claim 24 wherein Q is an aliphatic hydrocarbon radical free of a tertiary α-carbon atom, Q' is a halogen and Q'' is hydrogen.

27. A polyphenylene ether of claim 24 wherein Q is an aliphatic hydrocarbon radical free of a tertiary α-carbon atom, Q' is an aryl radical and Q'' is hydrogen.

28. A polyphenylene ether of claim 24 wherein Q is methyl and Q' is phenyl.

29. A polyphenylene ether of claim 24 wherein Q is an aryl radical, Q' is a halogen and Q'' is hydrogen.

30. A polyphenylene ether of claim 24 wherein Q is phenyl and Q' is chlorine.

31. A polyphenylene ether of claim 24 wherein Q is an aliphatic hydrocarbon radical free of a tertiary α-carbon atom, and Q' and Q'' are hydrogen.

32. A polymer of claim 24 in the form of a fiber.

33. A polyphenylene ether obtained from phenol, said polymer having a molecular weight of at least 10,000.

34. A poly-(2,6-dimethylphenylene-1,4) ether having a molecular weight of at least 10,000.

35. A poly-(2-chlorophenylene) ether obtained from 2-chlorophenol, said polymer having a molecular weight of at least 10,000.

36. A poly-(2-methylphenylene) ether obtained from 2-methylphenol, said polymer having a molecular weight of at least 10,000.

37. Poly-(2-phenylphenylene) ether obtained from 2-phenylphenol, said polymer having a molecular weight of at least 10,000.

38. A polymer of claim 24 in the form of a film.

References Cited by the Examiner

UNITED STATES PATENTS 2,961,384  11/1960  McKinney _____ 260—47

OTHER REFERENCES

Brackman et al. Rec. Trav. Chem., vol. 74, pages 1107–1118 (1955) (article in English).

Staffin et al., Rubber World, vol. 139, page 408 (1958).

WILLIAM H. SHORT, *Primary Examiner.*

J. R. LIEBERMAN, J. C. MARTIN, L. M. PHYNES, *Assistant Examiners.*